US012693741B2

(12) United States Patent
Zhang et al.

(10) Patent No.: US 12,693,741 B2
(45) Date of Patent: Jul. 28, 2026

(54) GLINT NUMBERING METHOD, SYSTEM, AND DEVICE, AND STORAGE MEDIUM

(71) Applicant: Nanchang Virtual Reality Research Institute Co., Ltd., Nanchang (CN)

(72) Inventors: Xin Zhang, Nanchang (CN); Qimin Sun, Nanchang (CN)

(73) Assignee: Nanchang Virtual Reality Research Institute Co., Ltd., Nanchang (CN)

( * ) Notice: Subject to any disclaimer, the term of this patent is extended or adjusted under 35 U.S.C. 154(b) by 0 days.

(21) Appl. No.: 19/294,373

(22) Filed: Aug. 8, 2025

(65) Prior Publication Data

US 2026/0072499 A1 Mar. 12, 2026

Related U.S. Application Data

(63) Continuation of application No. PCT/CN2024/144005, filed on Dec. 30, 2024.

(30) Foreign Application Priority Data

Sep. 11, 2024 (CN) .......................... 202411267552.9

(51) Int. Cl.
*G06F 3/01* (2006.01)
*G02B 27/00* (2006.01)
*G06V 40/18* (2022.01)

(52) U.S. Cl.
CPC ......... *G06F 3/013* (2013.01); *G02B 27/0093* (2013.01); *G06V 40/197* (2022.01)

(58) Field of Classification Search
CPC .. G06F 3/013; G06V 40/197; G02V 27/0093; G02B 27/0093
See application file for complete search history.

(56) References Cited

U.S. PATENT DOCUMENTS 11,181,977 B2 * 11/2021 Jia ............................ G06F 3/013
12,440,098 B2 * 10/2025 Lee ....................... G06V 10/143
(Continued)

FOREIGN PATENT DOCUMENTS

SE 546828 C2 * 2/2025 ............. G06V 10/44
WO WO-2025146022 A1 * 7/2025 ............... G06T 7/73

OTHER PUBLICATIONS

SE-546828-C2; Feb. 25, 2025; Rosell Mikael (English Translation).*

(Continued)

*Primary Examiner* — Ricardo Osorio

(57) ABSTRACT

This application provides a glint numbering method, system, and device, and a storage medium. An ideal glint position array and corresponding ideal glint numbering sequence for each light source are obtained through initialization detection; then a set of first candidate glint numbering sequences is generated for a to-be-numbered glint position array. When the number of glints is greater than 1, the to-be-numbered glint position coordinates and the ideal glint position coordinates are vectorized, a first to-be-numbered glint vector between coordinates of a pair of adjacent to-be-numbered glint positions and a first vector angle between the first to-be-numbered glint vector and a corresponding first ideal glint vector are calculated, and the first candidate glint numbering sequence is filtered to obtain a glint numbering result sequence. In embodiments of this application, light source numbering for each glint in glint detection through vectorized comparison is achieved, ensuring accuracy of glint numbering results.

20 Claims, 14 Drawing Sheets

(56) References Cited

U.S. PATENT DOCUMENTS

| | | | |
|---|---|---|---|
| 2020/0183490 A1* | 6/2020 | Klingström | G06T 7/73 |
| 2020/0326777 A1* | 10/2020 | Shoushtari | G02B 27/0093 |
| 2020/0372678 A1* | 11/2020 | Farmer | G06F 3/013 |
| 2025/0308042 A1* | 10/2025 | Fu | G06T 7/251 |

OTHER PUBLICATIONS

WO-2025146022-A1; Jul. 10, 2025; Mao, Fenghui (English Translation).*

* cited by examiner

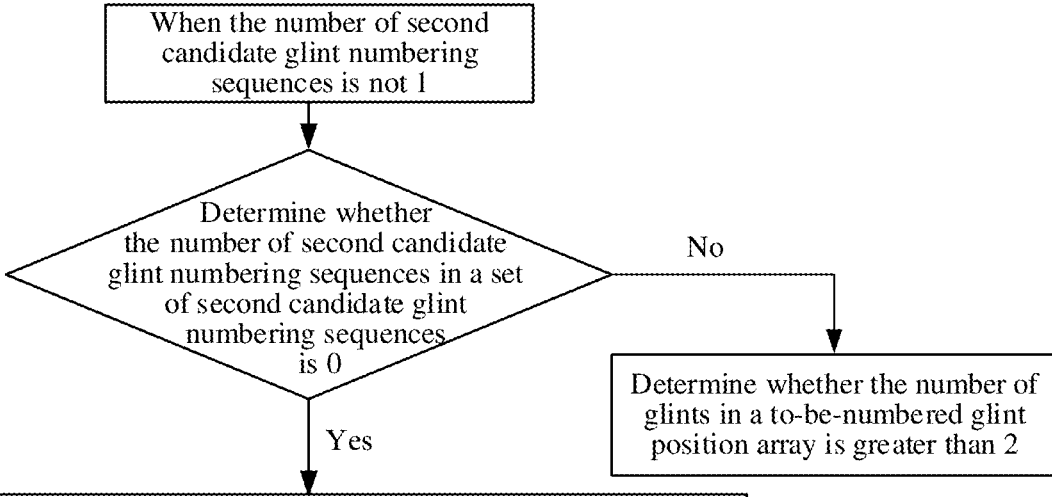

When the number of second candidate glint numbering sequences is not 1

Determine whether the number of second candidate glint numbering sequences in a set of second candidate glint numbering sequences is 0

No

Determine whether the number of glints in a to-be-numbered glint position array is greater than 2

Yes

Establish an eye image horizontal line coordinate system, and determine a first glint position conversion coordinate corresponding to each to-be-numbered glint position coordinate in a current to-be-numbered glint position array in an eye image horizontal line coordinate system Compare magnitudes of the first glint position conversion coordinates, and identify a to-be-numbered glint position coordinate corresponding to an interference glint according to a second preset rule Delete the identified to-be-numbered glint position coordinate corresponding to the interference glint from the current to-be-numbered glint position array to obtain an updated to-be-numbered glint position array Loop back to generating a set of first candidate glint numbering sequences according to a first preset rule

FIG. 6

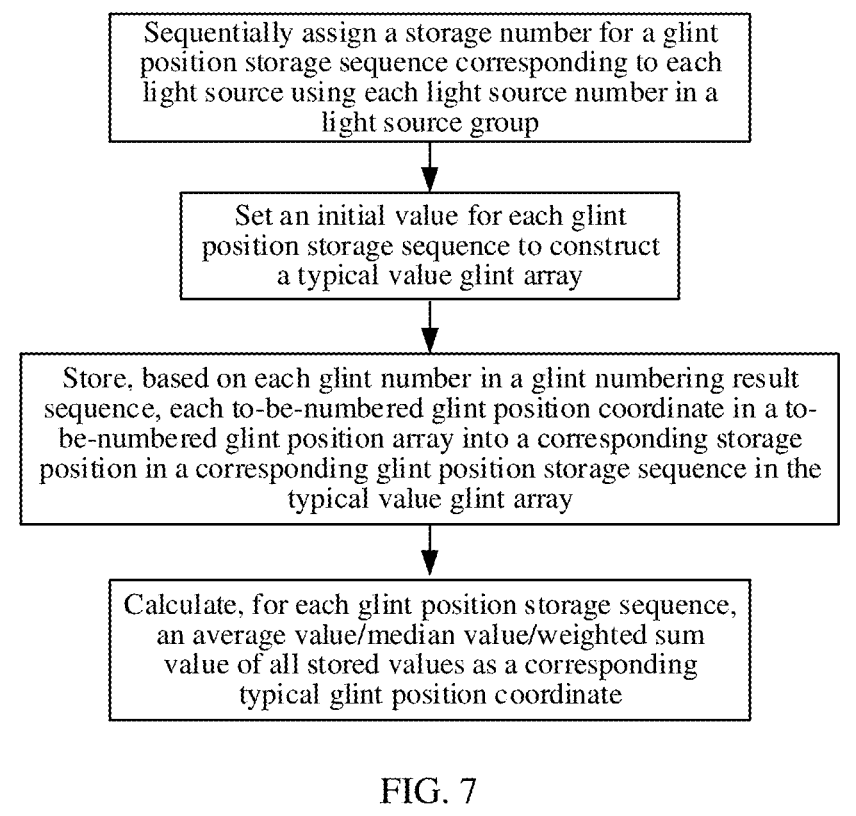

Sequentially assign a storage number for a glint position storage sequence corresponding to each light source using each light source number in a light source group Set an initial value for each glint position storage sequence to construct a typical value glint array Store, based on each glint number in a glint numbering result sequence, each to-be-numbered glint position coordinate in a to-be-numbered glint position array into a corresponding storage position in a corresponding glint position storage sequence in the typical value glint array Calculate, for each glint position storage sequence, an average value/median value/weighted sum value of all stored values as a corresponding typical glint position coordinate

FIG. 7

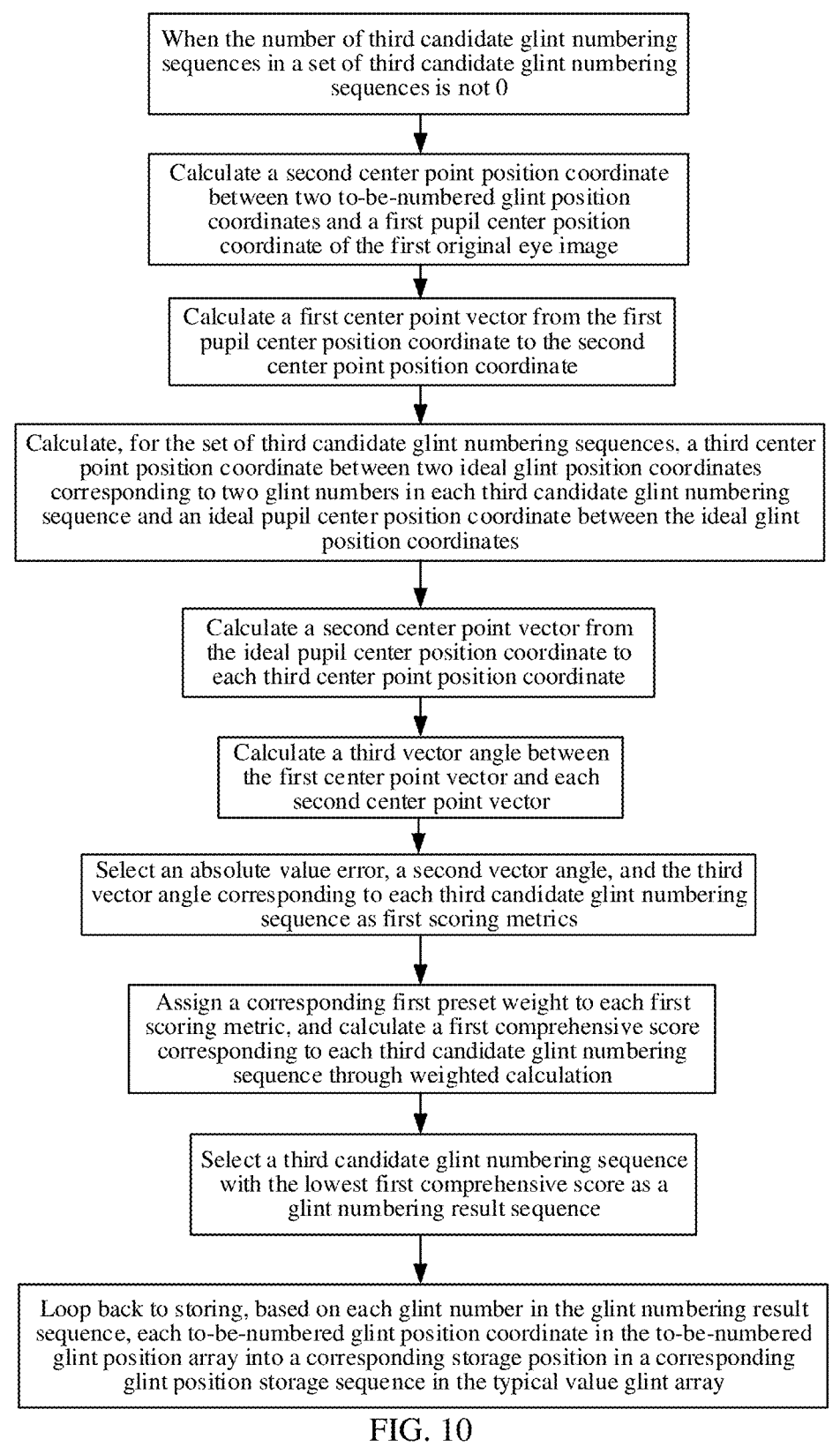

When the number of third candidate glint numbering sequences in a set of third candidate glint numbering sequences is not 0

Calculate a second center point position coordinate between two to-be-numbered glint position coordinates and a first pupil center position coordinate of the first original eye image Calculate a first center point vector from the first pupil center position coordinate to the second center point position coordinate Calculate, for the set of third candidate glint numbering sequences, a third center point position coordinate between two ideal glint position coordinates corresponding to two glint numbers in each third candidate glint numbering sequence and an ideal pupil center position coordinate between the ideal glint position coordinates Calculate a second center point vector from the ideal pupil center position coordinate to each third center point position coordinate Calculate a third vector angle between the first center point vector and each second center point vector Select an absolute value error, a second vector angle, and the third vector angle corresponding to each third candidate glint numbering sequence as first scoring metrics Assign a corresponding first preset weight to each first scoring metric, and calculate a first comprehensive score corresponding to each third candidate glint numbering sequence through weighted calculation Select a third candidate glint numbering sequence with the lowest first comprehensive score as a glint numbering result sequence Loop back to storing, based on each glint number in the glint numbering result sequence, each to-be-numbered glint position coordinate in the to-be-numbered glint position array into a corresponding storage position in a corresponding glint position storage sequence in the typical value glint array

FIG. 10

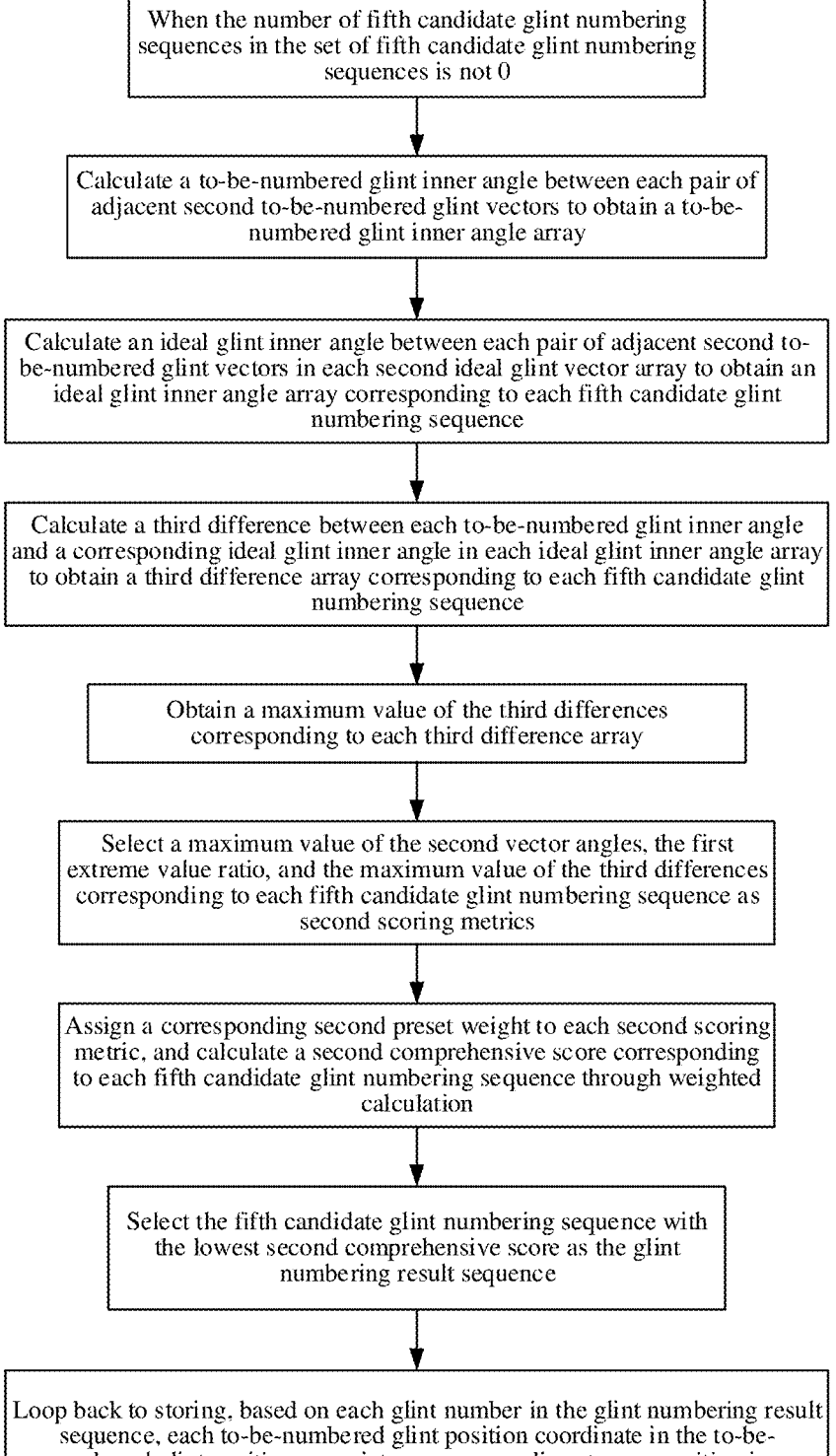

When the number of fifth candidate glint numbering sequences in the set of fifth candidate glint numbering sequences is not 0

Calculate a to-be-numbered glint inner angle between each pair of adjacent second to-be-numbered glint vectors to obtain a to-be-numbered glint inner angle array Calculate an ideal glint inner angle between each pair of adjacent second to-be-numbered glint vectors in each second ideal glint vector array to obtain an ideal glint inner angle array corresponding to each fifth candidate glint numbering sequence Calculate a third difference between each to-be-numbered glint inner angle and a corresponding ideal glint inner angle in each ideal glint inner angle array to obtain a third difference array corresponding to each fifth candidate glint numbering sequence Obtain a maximum value of the third differences corresponding to each third difference array Select a maximum value of the second vector angles, the first extreme value ratio, and the maximum value of the third differences corresponding to each fifth candidate glint numbering sequence as second scoring metrics Assign a corresponding second preset weight to each second scoring metric, and calculate a second comprehensive score corresponding to each fifth candidate glint numbering sequence through weighted calculation Select the fifth candidate glint numbering sequence with the lowest second comprehensive score as the glint numbering result sequence Loop back to storing, based on each glint number in the glint numbering result sequence, each to-be-numbered glint position coordinate in the to-be-numbered glint position array into a corresponding storage position in a corresponding glint position storage sequence in the typical value glint array

GLINT NUMBERING METHOD, SYSTEM, AND DEVICE, AND STORAGE MEDIUM

CROSS-REFERENCE TO RELATED APPLICATIONS

This application is a Continuation Application of PCT Application No. PCT/CN2024/144005 filed on Dec. 30, 2024, which claims priority to Chinese Patent Application No. 2024112675529, filed on Sep. 11, 2024 and entitled "GLINT NUMBERING METHOD, SYSTEM, AND DEVICE, AND STORAGE MEDIUM," which is hereby incorporated herein by reference in its entirety.

TECHNICAL FIELD

Embodiments of this application relate to the field of gaze tracking technologies, and in particular, to a glint numbering method, a glint numbering system, a glint numbering device, and a storage medium.

BACKGROUND

With the development of technology, eye-tracking technology has become a research hotspot. Eye-tracking is a technique used to study the movement trajectory of human eyes during visual tasks. It can record the gaze point position and duration of the human eye when viewing visual information, and further infer the perception, cognition, and decision-making processes of the human eye in visual tasks, helping to understand the mechanisms of human visual information processing.

In eye-tracking, gaze estimation is critical, but gaze estimation requires glint detection to determine glint numbers for visual estimation. Glint numbering refers to identifying a corresponding light source number for a given glint. Infrared light sources form glints on the cornea of the eyeball; for example, the glint formed by light source 1 is glint 1. In the prior art, eye images are typically acquired, and glints are manually labeled or algorithms are used to detect or filter the positions of glints in the eye images. However, it is not possible to number the glints and ensure the accuracy of the numbering results.

SUMMARY

To address this, embodiments of this application provide a glint numbering method, a glint numbering system, a glint numbering device, and a storage medium to solve the technical problem in existing glint detection, where it is not possible to number glints and ensure the accuracy of the numbering results.

To achieve the above objectives, embodiments of this application provide the following technical solutions.

According to a first aspect of embodiments of this application, a glint numbering method is provided, including:

performing initialization detection on ideal glint position coordinates for each light source in a light source group to generate a sorted ideal glint position array and a corresponding ideal glint numbering sequence;

receiving a sorted to-be-numbered glint position array and generating a set of first candidate glint numbering sequences according to a first preset rule;

determining whether the number of glints in the to-be-numbered glint position array is greater than 1;

when the number of glints in the to-be-numbered glint position array is greater than 1, calculating a first to-be-numbered glint vector between coordinates of a pair of adjacent to-be-numbered glint positions to obtain a first to-be-numbered glint vector array;

matching each pair of adjacent glint numbers in each first candidate glint numbering sequence with light source numbers in the ideal glint numbering sequence, and calculating a corresponding first ideal glint vector for each first to-be-numbered glint vector to obtain a first ideal glint vector array corresponding to each first to-be-numbered glint vector array;

calculating a first vector angle between each first to-be-numbered glint vector and a corresponding first ideal glint vector to obtain a first vector angle array corresponding to each first candidate glint numbering sequence;

determining whether a maximum value of the first vector angles in each first vector angle array is greater than a first preset threshold;

when the maximum value of the first vector angles in a current first vector angle array is greater than the first preset threshold, deleting a corresponding first candidate glint numbering sequence;

when the maximum value of the first vector angles in the current first vector angle array is less than or equal to the first preset threshold, retaining a corresponding first candidate glint numbering sequence as a second candidate glint numbering sequence;

generating a set of second candidate glint numbering sequences using all retained second candidate glint numbering sequences;

determining whether the number of second candidate glint numbering sequences is 1; and when the number of second candidate glint numbering sequences is 1, using the second candidate glint numbering sequence as a glint numbering result sequence corresponding to the current to-be-numbered glint position array.

Further, before determining whether the number of glints in the to-be-numbered glint position array is greater than 1, the method further includes:

determining whether an original eye image corresponding to the to-be-numbered glint position array is a first frame of a captured eye image;

when the original eye image corresponding to the to-be-numbered glint position array is not the first frame of the captured eye image, forming an original eye image pair using a current original eye image and a previous frame of the original eye image;

detecting, based on the original eye image pair, whether a target human eye is in a first gaze state;

when the target human eye is in the first gaze state, directly referencing a glint numbering result sequence of the previous frame of the original eye image as the glint numbering result sequence corresponding to the current to-be-numbered glint position array;

when the target human eye is not in the first gaze state, detecting, based on the original eye image pair, whether the target human eye is in a second gaze state;

when the target human eye is in the second gaze state, directly referencing the glint numbering result sequence of the previous frame of the original eye image as the glint numbering result sequence corresponding to the current to-be-numbered glint position array; and when the original eye image corresponding to the to-be-numbered glint position array is the first frame of the captured eye image or the target human eye is not in the second gaze state, determining whether the number of glints in the to-be-numbered glint position array is greater than 1.

Further, the detecting, based on the original eye image pair, whether the target human eye is in the first gaze state includes:

obtaining, for the original eye image pair, a positional coordinate pair of a first pupil center point;

calculating a first difference based on the positional coordinate pair of the first pupil center point;

using the first difference as first detection information;

determining whether the first detection information satisfies a first preset condition, where the first preset condition is that the first difference is less than a second preset threshold;

when the first detection information satisfies the first preset condition, determining whether the number of glint numbers in the glint numbering result sequence of the previous frame of the original eye image is equal to the number of glints in the current to-be-numbered glint position array;

when the number of glint numbers in the glint numbering result sequence of the previous frame of the original eye image is equal to the number of glints in the current to-be-numbered glint position array, determining that the target human eye is in the first gaze state; and when the first detection information does not satisfy the first preset condition, or the number of glint numbers in the glint numbering result sequence of the previous frame of the original eye image is not equal to the number of glints in the current to-be-numbered glint position array, determining that the target human eye is not in the first gaze state.

Further, the detecting, based on the original eye image pair, whether the target human eye is in the second gaze state includes:

obtaining, for the original eye image pair, each to-be-numbered glint position coordinate pair and a total number pair of to-be-numbered glint position coordinates from a corresponding to-be-numbered glint position array;

calculating a corresponding second difference based on the each to-be-numbered glint position coordinate pair;

using each second difference and the total number pair of to-be-numbered glint position coordinates as second detection information;

determining whether the second detection information satisfies a second preset condition, where the second preset condition is that each second difference is less than a third preset threshold and that two total numbers of to-be-numbered glint positional coordinates in the total number pair of to-be-numbered glint position coordinates are identical;

when the second detection information satisfies the second preset condition, determining that the target human eye is in the second gaze state; and when the second detection information does not satisfy the second preset condition, determining that the target human eye is not in the second gaze state.

Further, the glint numbering method in the embodiments of this application further includes:

when the number of second candidate glint numbering sequences is not 1, determining whether the number of second candidate glint numbering sequences in the set of second candidate glint numbering sequences is 0;

when the number of second candidate glint numbering sequences in the set of second candidate glint numbering sequences is 0, establishing an eye image horizontal line coordinate system, and determining a first glint position conversion coordinate corresponding to each to-be-numbered glint position coordinate in a current to-be-numbered glint position array in the eye image horizontal line coordinate system;

comparing magnitudes of the first glint position conversion coordinates, and identifying a to-be-numbered glint position coordinate corresponding to an interference glint according to a second preset rule; and deleting the identified to-be-numbered glint position coordinate corresponding to the interference glint from the current to-be-numbered glint position array to obtain an updated to-be-numbered glint position array, and looping back to generating a set of first candidate glint numbering sequences according to a first preset rule.

Further, the glint numbering method in the embodiments of this application further includes:

sequentially assigning a storage number for a glint position storage sequence corresponding to each light source using each light source number in the light source group;

setting an initial value for each glint position storage sequence to construct a typical value glint array;

storing, based on each glint number in the glint numbering result sequence, each to-be-numbered glint position coordinate in the to-be-numbered glint position array into a corresponding storage position in a corresponding glint position storage sequence in the typical value glint array; and calculating, for each glint position storage sequence, an average value/median value/weighted sum value of all stored values as a corresponding typical glint position coordinate.

Further, the glint numbering method in the embodiments of this application further includes:

when the number of second candidate glint numbering sequences in the set of second candidate glint numbering sequences is not 0, determining whether the number of glints in the to-be-numbered glint position array is greater than 2;

when the number of glints in the to-be-numbered glint position array is not greater than 2, where the number of glints in the to-be-numbered glint position array is 2, determining whether the glint position storage sequence corresponding to each glint number in each second candidate glint numbering sequence has a typical glint position coordinate that is not an initial value;

when the glint position storage sequence corresponding to each glint number in each second candidate glint numbering sequence has a typical glint position coordinate that is not an initial value, sequentially calculating, for each second candidate glint numbering sequence, a third distance between one to-be-numbered glint position coordinate in the to-be-numbered glint position array and the corresponding typical glint position coordinate, and a fourth distance between another to-be-numbered glint position coordinate and the corresponding typical glint position coordinate;

using the third distance and the fourth distance as a distance error pair, and forming a distance error pair array corresponding to the set of second candidate glint numbering sequences from the distance error pairs corresponding to individual second candidate glint numbering sequences;

using the glint numbers in the second candidate glint numbering sequence corresponding to a maximum value of the third distance and a maximum value of the fourth distance in the distance error pair array as a first glint number and a second glint number, respectively;

determining whether the first glint number is equal to the second glint number;

when the first glint number is not equal to the second glint number, comparing the maximum value of the third distance and the maximum value of the fourth distance, deleting the distance error pair corresponding to the larger value from the distance error pair array, deleting the second candidate glint numbering sequence corresponding to the larger value from the set of second candidate glint numbering sequences, and looping back to determining whether the number of second candidate glint numbering sequences is 1;

when the first glint number is equal to the second glint number, determining whether the number of current second candidate glint numbering sequences is greater than 2;

when the number of current second candidate glint numbering sequences is greater than 2, deleting the second candidate glint numbering sequence corresponding to the first glint number and the second glint number from the set of second candidate glint numbering sequences, deleting the distance error pair corresponding to the first glint number and the second glint number from the distance error pair array, and looping back to determining whether the number of second candidate glint numbering sequences is 1;

when the number of current second candidate glint numbering sequences is not greater than 2, where the number of current second candidate glint numbering sequences is equal to 2, calculating a fifth distance between two to-be-numbered glint position coordinates and a sixth distance between typical glint position coordinates corresponding to two glint numbers in each second candidate glint numbering sequence;

calculating a ratio of the fifth distance to the sixth distance to obtain a corresponding first error reference ratio;

retaining a second candidate glint numbering sequence corresponding to a first error reference ratio closest to 1; and using the finally retained second candidate glint numbering sequence as the glint numbering result sequence corresponding to the current to-be-numbered glint position array, and looping back to storing, based on each glint number in the glint numbering result sequence, each to-be-numbered glint position coordinate in the to-be-numbered glint position array into the corresponding storage position in a corresponding glint position storage sequence in the typical value glint array.

Further, a glint detection method disclosed in the embodiments of this application further includes:

when in each second candidate glint numbering sequence, there exists a glint position storage sequence corresponding to a glint number and having only an initial value, directly calculating a fifth distance between two to-be-numbered glint position coordinates and a seventh distance between two ideal glint position coordinates in the ideal glint position array corresponding to two glint numbers in each second candidate glint numbering sequence;

calculating a ratio of the fifth distance to the seventh distance to obtain a corresponding second error reference ratio;

calculating an absolute value error between each second error reference ratio and 1;

determining whether the absolute value error is greater than a fourth preset threshold;

when the absolute value error is greater than the fourth preset threshold, deleting a corresponding second candidate glint numbering sequence;

when the absolute value error is less than or equal to the fourth preset threshold, retaining a corresponding second candidate glint numbering sequence as a third candidate glint numbering sequence;

generating a set of third candidate glint numbering sequences using all retained third candidate glint numbering sequences;

determining whether the number of third candidate glint numbering sequences is 1; and when the number of third candidate glint numbering sequences is 1, using the third candidate glint numbering sequence as the glint numbering result sequence corresponding to the current to-be-numbered glint position array, and looping back to storing, based on each glint number in the glint numbering result sequence, each to-be-numbered glint position coordinate in the to-be-numbered glint position array into the corresponding storage position in a corresponding glint position storage sequence in the typical value glint array.

Further, a glint detection method disclosed in the embodiments of this application further includes:

when the number of third candidate glint numbering sequences is not 1, determining whether the number of third candidate glint numbering sequences in the set of third candidate glint numbering sequences is 0;

when the number of third candidate glint numbering sequences in the set of third candidate glint numbering sequences is 0, establishing an eye image horizontal line coordinate system, and determining a second glint position conversion coordinate corresponding to each to-be-numbered glint position coordinate in a current to-be-numbered glint position array in the eye image horizontal line coordinate system;

comparing magnitudes of the second glint position conversion coordinates, and identifying a to-be-numbered glint position coordinate corresponding to an interference glint according to a second preset rule; and deleting the identified to-be-numbered glint position coordinate corresponding to the interference glint from the current to-be-numbered glint position array to obtain an updated to-be-numbered glint position array, and looping back to generating a set of first candidate glint numbering sequences according to a first preset rule.

Further, a glint numbering method disclosed in the embodiments of this application further includes:

when the number of third candidate glint numbering sequences in the set of third candidate glint numbering sequences is not 0, calculating a second center point position coordinate between two to-be-numbered glint position coordinates and a first pupil center position coordinate of the original eye image;

calculating a first center point vector from the first pupil center position coordinate to the second center point position coordinate;

calculating, for the set of third candidate glint numbering sequences, a third center point position coordinate between two ideal glint position coordinates corresponding to two glint numbers in each third candidate glint numbering sequence and an ideal pupil center position coordinate between the ideal glint position coordinates;

calculating a second center point vector from the ideal pupil center position coordinate to each third center point position coordinate;

calculating a third vector angle between the first center point vector and each second center point vector;

selecting an absolute value error, a second vector angle, and the third vector angle corresponding to each third candidate glint numbering sequence as first scoring metrics;

assigning a corresponding first preset weight to each first scoring metric, and calculating a first comprehensive score corresponding to each third candidate glint numbering sequence through weighted calculation; and selecting a third candidate glint numbering sequence with the lowest first comprehensive score as the glint numbering result sequence, and looping back to storing, based on each glint number in the glint numbering result sequence, each to-be-numbered glint position coordinate in the to-be-numbered glint position array into the corresponding storage position in a corresponding glint position storage sequence in the typical value glint array.

Further, a glint numbering method in the embodiments of this application further includes:

when the number of glints in the to-be-numbered glint position array is greater than 2, calculating a second to-be-numbered glint vector between any two to-be-numbered glint position coordinates to obtain a second to-be-numbered glint vector array;

matching any two glint numbers in each second candidate glint numbering sequence with light source numbers in the ideal glint numbering sequence, and calculating a second ideal glint vector corresponding to each second to-be-numbered glint vector to obtain a second ideal glint vector array corresponding to the second to-be-numbered glint vector array;

calculating a second vector angle between each second to-be-numbered glint vector and a corresponding second ideal glint vector to obtain a second vector angle array corresponding to each second candidate glint numbering sequence;

determining whether a maximum value of the second vector angles in each second vector angle array is greater than a fifth preset threshold;

when the maximum value of the second vector angles in a current second vector angle array is greater than the fifth preset threshold, deleting a corresponding second candidate glint numbering sequence;

when the maximum value of the second vector angles in the current second vector angle array is less than or equal to the fifth preset threshold, retaining a corresponding second candidate glint numbering sequence as a fourth candidate glint numbering sequence;

generating a set of fourth candidate glint numbering sequences using all retained fourth candidate glint numbering sequences;

determining whether the number of fourth candidate glint numbering sequences is 1; and when the number of fourth candidate glint numbering sequences is 1, using the fourth candidate glint numbering sequence as the glint numbering result sequence corresponding to the current to-be-numbered glint position array, and looping back to storing, based on each glint number in the glint numbering result sequence, each to-be-numbered glint position coordinate in the to-be-numbered glint position array into the corresponding storage position in a corresponding glint position storage sequence in the typical value glint array.

Further, a glint numbering method in the embodiments of this application further includes:

when the number of fourth candidate glint numbering sequences is not 1, determining whether the number of fourth candidate glint numbering sequences in the set of fourth candidate glint numbering sequences is 0;

when the number of fourth candidate glint numbering sequences in the set of fourth candidate glint numbering sequences is 0, establishing an eye image horizontal line coordinate system, and determining a third glint position conversion coordinate corresponding to each to-be-numbered glint position coordinate in a current to-be-numbered glint position array in the eye image horizontal line coordinate system;

comparing magnitudes of the third glint position conversion coordinates, and identifying a to-be-numbered glint position coordinate corresponding to an interference glint according to a second preset rule; and deleting the identified to-be-numbered glint position coordinate corresponding to the interference glint from the current to-be-numbered glint position array to obtain an updated to-be-numbered glint position array, and looping back to generating a set of first candidate glint numbering sequences according to a first preset rule.

Further, a glint numbering method in the embodiments of this application further includes:

when the number of fourth candidate glint numbering sequences in the set of fourth candidate glint numbering sequences is not 0, calculating a candidate glint side length of each second to-be-numbered glint vector to obtain a corresponding candidate glint side length array;

calculating an ideal glint side length of a second ideal glint vector corresponding to each second to-be-numbered glint vector in each second ideal glint vector array to obtain an ideal glint side length array corresponding to each fourth candidate glint numbering sequence;

calculating a glint side length ratio of each ideal glint side length in the ideal glint side length array divided by the corresponding candidate glint side length to obtain a glint side length ratio array corresponding to each fourth candidate glint numbering sequence;

selecting a maximum value and a minimum value of the glint side length ratios from each glint side length ratio array;

calculating a first extreme value ratio of the maximum value of the glint side length ratios divided by the corresponding minimum value of the glint side length ratios;

determining whether each first extreme value ratio is greater than a sixth preset threshold;

when a current first extreme value ratio is greater than the sixth preset threshold, deleting a corresponding fourth candidate glint numbering sequence;

when the current first extreme value ratio is less than or equal to the sixth preset threshold, retaining a corresponding fourth candidate glint numbering sequence as a fifth candidate glint numbering sequence;

generating a set of fifth candidate glint numbering sequences using all retained fifth candidate glint numbering sequences;

determining whether the number of fifth candidate glint numbering sequences is 1; and when the number of fifth candidate glint numbering sequences is 1, using the fifth candidate glint numbering sequence as the glint numbering result sequence corresponding to the current to-be-numbered glint position array, and looping back to storing, based on each glint number in the glint numbering result sequence, each to-be-numbered glint position coordinate in the to-be-numbered glint position array into the corresponding storage position in a corresponding glint position storage sequence in the typical value glint array.

Further, a glint numbering method disclosed in the embodiments of this application further includes:

when the number of fifth candidate glint numbering sequences is not 1, determining whether the number of fifth candidate glint numbering sequences in the set of fifth candidate glint numbering sequences is 0;

when the number of fifth candidate glint numbering sequences in the set of fifth candidate glint numbering sequences is 0, establishing an eye image horizontal line coordinate system, and determining a fourth glint position conversion coordinate corresponding to each to-be-numbered glint position coordinate in a current to-be-numbered glint position array in the eye image horizontal line coordinate system;

comparing magnitudes of the fourth glint position conversion coordinates, and identifying a to-be-numbered glint position coordinate corresponding to an interference glint according to a second preset rule;

deleting the identified to-be-numbered glint position coordinate corresponding to the interference glint from the current to-be-numbered glint position array to obtain an updated to-be-numbered glint position array; and regenerating all permutation sequences corresponding to all light source numbers based on the number of glints corresponding to the updated to-be-numbered glint position array, and storing them as updated first candidate glint numbering sequences to form an updated set of first candidate glint numbering sequences.

Further, a glint numbering method disclosed in the embodiments of this application further includes:

when the number of fifth candidate glint numbering sequences in the set of fifth candidate glint numbering sequences is not 0, calculating a to-be-numbered glint inner angle between each pair of adjacent second to-be-numbered glint vectors to obtain a to-be-numbered glint inner angle array;

calculating an ideal glint inner angle between each pair of adjacent second to-be-numbered glint vectors in each second ideal glint vector array to obtain an ideal glint inner angle array corresponding to each fifth candidate glint numbering sequence;

calculating a third difference between each to-be-numbered glint inner angle and a corresponding ideal glint inner angle in each ideal glint inner angle array to obtain a third difference array corresponding to each fifth candidate glint numbering sequence;

obtaining a maximum value of the third differences corresponding to each third difference array;

selecting a maximum value of the second vector angles, the first extreme value ratio, and the maximum value of the third differences corresponding to each fifth candidate glint numbering sequence as second scoring metrics;

assigning a corresponding second preset weight to each second scoring metric, and calculating a second comprehensive score corresponding to each fifth candidate glint numbering sequence through weighted calculation; and selecting the fifth candidate glint numbering sequence with the lowest second comprehensive score as the glint numbering result sequence, and looping back to storing, based on each glint number in the glint numbering result sequence, each to-be-numbered glint position coordinate in the to-be-numbered glint position array into the corresponding storage position in a corresponding glint position storage sequence in the typical value glint array.

Further, a glint numbering method in the embodiments of this application further includes:

when the number of glints in the to-be-numbered glint position array is not greater than 1, where the number of glints in the to-be-numbered glint position array is 1, determining whether there exists a glint position storage sequence in a current typical value glint array with a typical glint position coordinate that is not an initial value;

when there does not exist a glint position storage sequence in the current typical value glint array with a typical glint position coordinate that is not an initial value, skipping performing numbering on the current to-be-numbered glint position array, and looping back to processing a to-be-numbered glint position array corresponding to a next frame of the original eye image; and when there exists a glint position storage sequence in the current typical value glint array with a typical glint position coordinate that is not an initial value, selecting a glint number of the glint position storage sequence corresponding to the typical glint position coordinate closest to a current to-be-numbered glint position coordinate to obtain a corresponding glint numbering result sequence, and looping back to storing, based on each glint number in the glint numbering result sequence, each to-be-numbered glint position coordinate in the to-be-numbered glint position array into the corresponding storage position in a corresponding glint position storage sequence in the typical value glint array.

According to a second aspect of embodiments of this application, a glint numbering system is provided, configured to perform the steps of any one of the glint numbering methods described above. The system includes:

an initialization module configured to perform initialization detection on ideal glint position coordinates for each light source in a light source group to generate a sorted ideal glint position array and a corresponding ideal glint numbering sequence;

a generation module configured to receive a sorted to-be-numbered glint position array and generate a set of first candidate glint numbering sequences according to a first preset rule;

a filtering module configured to perform the following steps:

determining whether the number of glints in the to-be-numbered glint position array is greater than 1;

when the number of glints in the to-be-numbered glint position array is greater than 1, calculating a first to-be-numbered glint vector between coordinates of a pair of adjacent to-be-numbered glint positions to obtain a first to-be-numbered glint vector array;

matching each pair of adjacent glint numbers in each first candidate glint numbering sequence with light source numbers in the ideal glint numbering sequence, and calculating a corresponding first ideal glint vector for each first to-be-numbered glint vector to obtain a first ideal glint vector array corresponding to each first to-be-numbered glint vector array;

calculating a first vector angle between each first to-be-numbered glint vector and a corresponding first ideal glint vector to obtain a first vector angle array corresponding to each first candidate glint numbering sequence;

determining whether a maximum value of the first vector angles in each first vector angle array is greater than a first preset threshold;

when the maximum value of the first vector angles in a current first vector angle array is greater than the first preset threshold, deleting a corresponding first candidate glint numbering sequence;

when the maximum value of the first vector angles in the current first vector angle array is less than or equal to the first preset threshold, retaining a corresponding first candidate glint numbering sequence as a second candidate glint numbering sequence; and generating a set of second candidate glint numbering sequences using all retained second candidate glint numbering sequences; and an output module configured to determine whether the number of second candidate glint numbering sequences is 1, and when the number of second candidate glint numbering sequences is 1, use the second candidate glint numbering sequence as a glint numbering result sequence corresponding to the current to-be-numbered glint position array.

Further, a glint numbering system disclosed in the embodiments of this application further includes a storage module configured to perform the following steps:

sequentially assigning a storage number for a glint position storage sequence corresponding to each light source using each light source number in a light source group;

setting an initial value for each glint position storage sequence to construct a typical value glint array;

storing, based on each glint number in the glint numbering result sequence, each to-be-numbered glint position coordinate in the to-be-numbered glint position array into a corresponding storage position in a corresponding glint position storage sequence in the typical value glint array; and calculating, for each glint position storage sequence, an average value/median value/weighted sum value of all stored values as a corresponding typical glint position coordinate.

According to a third aspect of embodiments of this application, a glint numbering device is provided. The device includes a processor and a memory; where the memory is configured to store one or more program instructions; and the processor is configured to execute the one or more program instructions to perform the steps of any one of the glint numbering methods described above.

According to a fourth aspect of embodiments of this application, a computer-readable storage medium is provided, having a computer program stored thereon, wherein the computer program, when executed by a processor, implements the steps of any one of the glint numbering methods described above.

As compared with the prior art, in the glint numbering method, glint numbering system, glint numbering device, and storage medium provided in the embodiments of this application, an ideal glint position array and corresponding ideal glint numbering sequence for each light source are obtained through initialization detection; then a set of first candidate glint numbering sequences is generated for a to-be-numbered glint position array. When the number of glints is greater than 1, the to-be-numbered glint position coordinates and the ideal glint position coordinates are vectorized, a first to-be-numbered glint vector between coordinates of a pair of adjacent to-be-numbered glint positions and a first vector angle between the first to-be-numbered glint vector and a corresponding first ideal glint vector are calculated, and the first candidate glint numbering sequence is filtered to obtain a glint numbering result sequence. In embodiments of this application, light source numbering for each glint in glint detection through vectorized comparison is achieved, ensuring accuracy of glint numbering results.

BRIEF DESCRIPTION OF DRAWINGS

To more clearly illustrate the embodiments of the present invention or the technical solutions in the prior art, a brief introduction to the drawings required for the description of the embodiments or the prior art is provided below. Obviously, the drawings described below are merely exemplary, and for those skilled in the art, other implementation drawings can be derived from the provided drawings without creative effort.

The structures, proportions, sizes, and the like shown in this specification are only used to match the content disclosed in the specification, for those familiar with this technology to understand and read, and are not used to limit the conditions under which the present invention can be implemented, thus having no technical significance. Any modification of the structure, change in the proportion relationship, or adjustment of the size, without affecting the effects and purposes that the present invention can produce, should still fall within the scope covered by the technical content disclosed in the present invention.

FIG. 6 is a schematic flowchart of filtering out a to-be-numbered glint position coordinate corresponding to an interference glint from a to-be-numbered glint position array when the number of second candidate glint numbering sequences is 0, according to an embodiment of this application;

13

Figure 8:
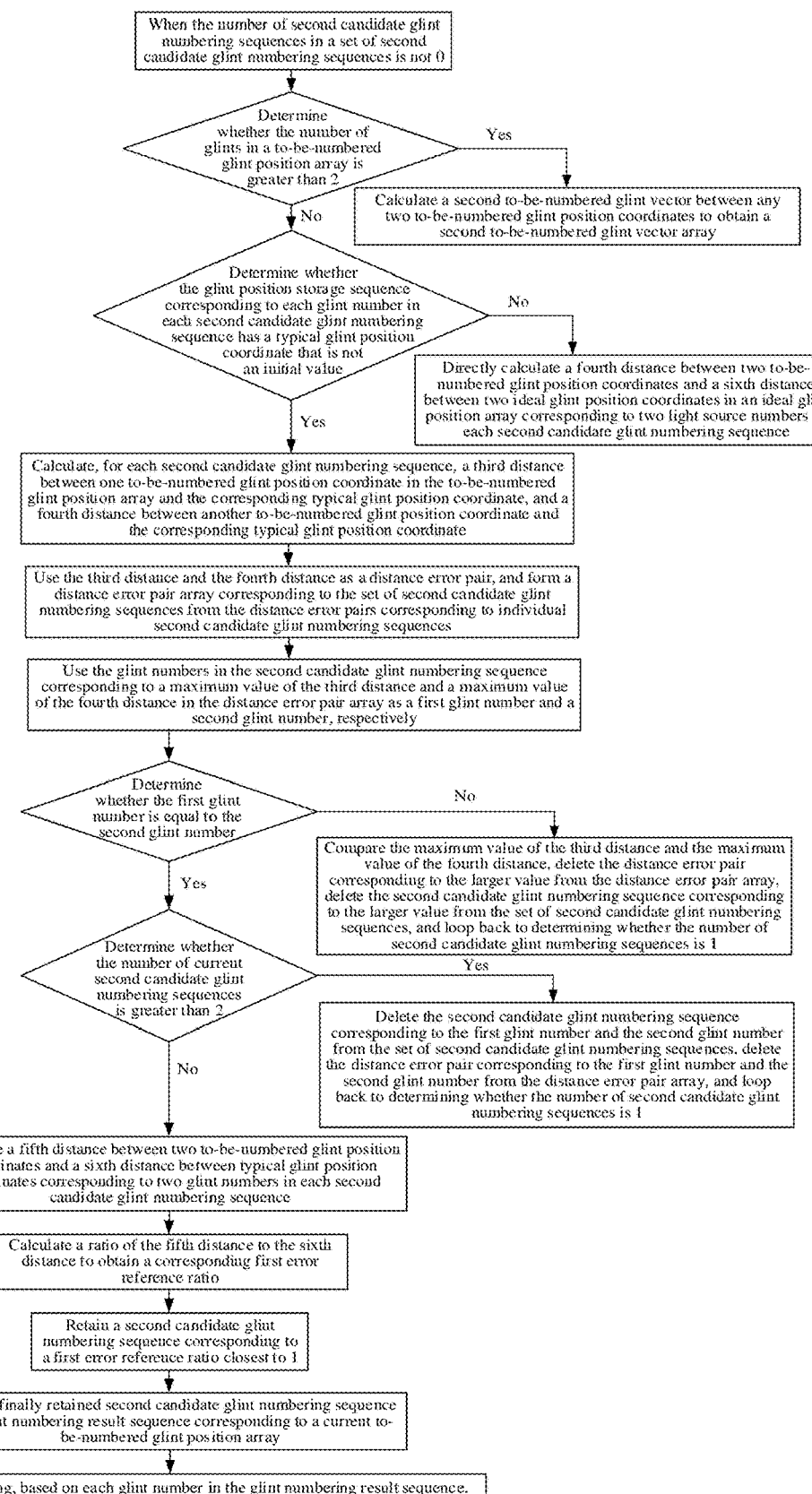
Figure 9:
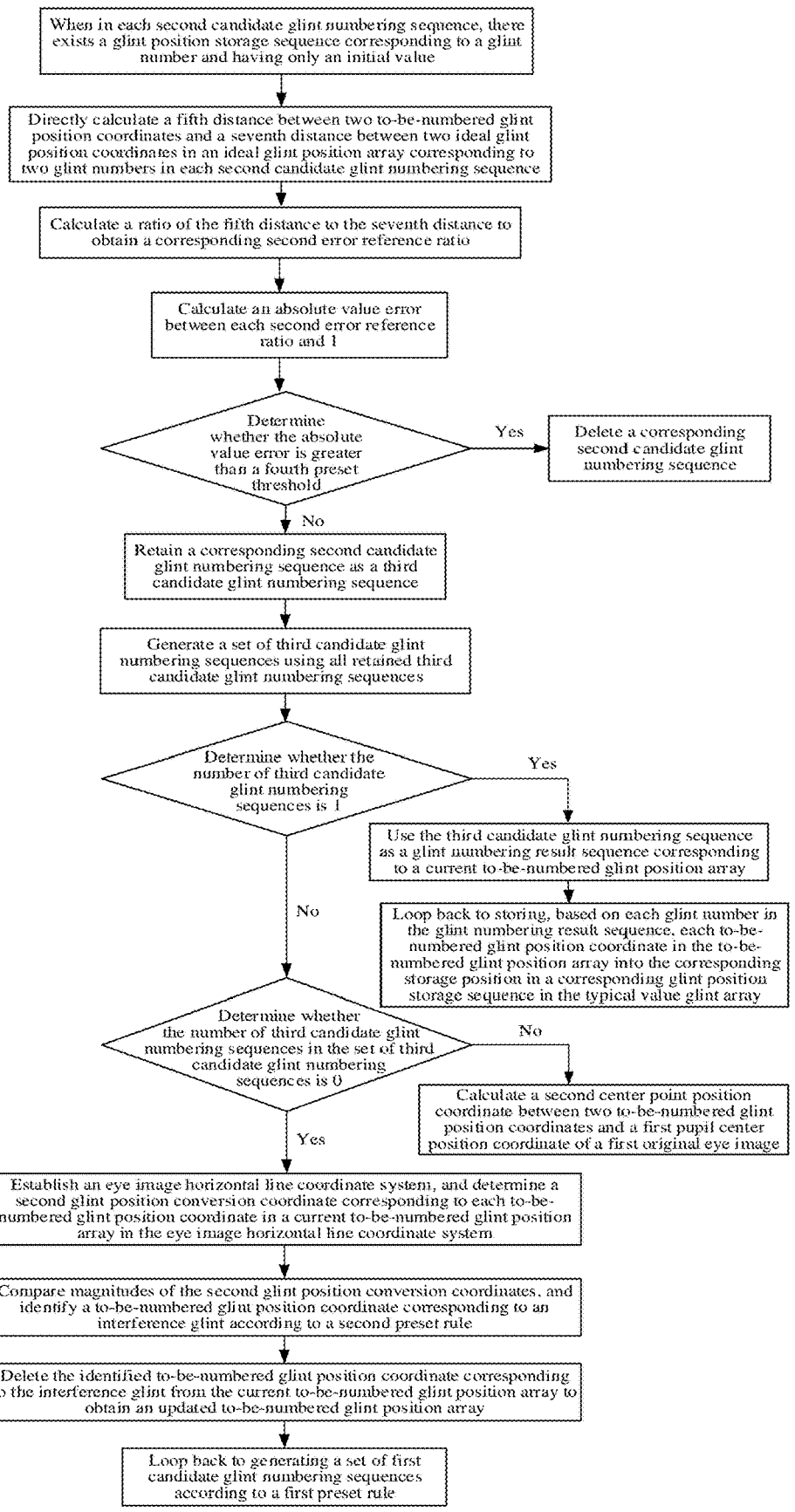
Figure 11:
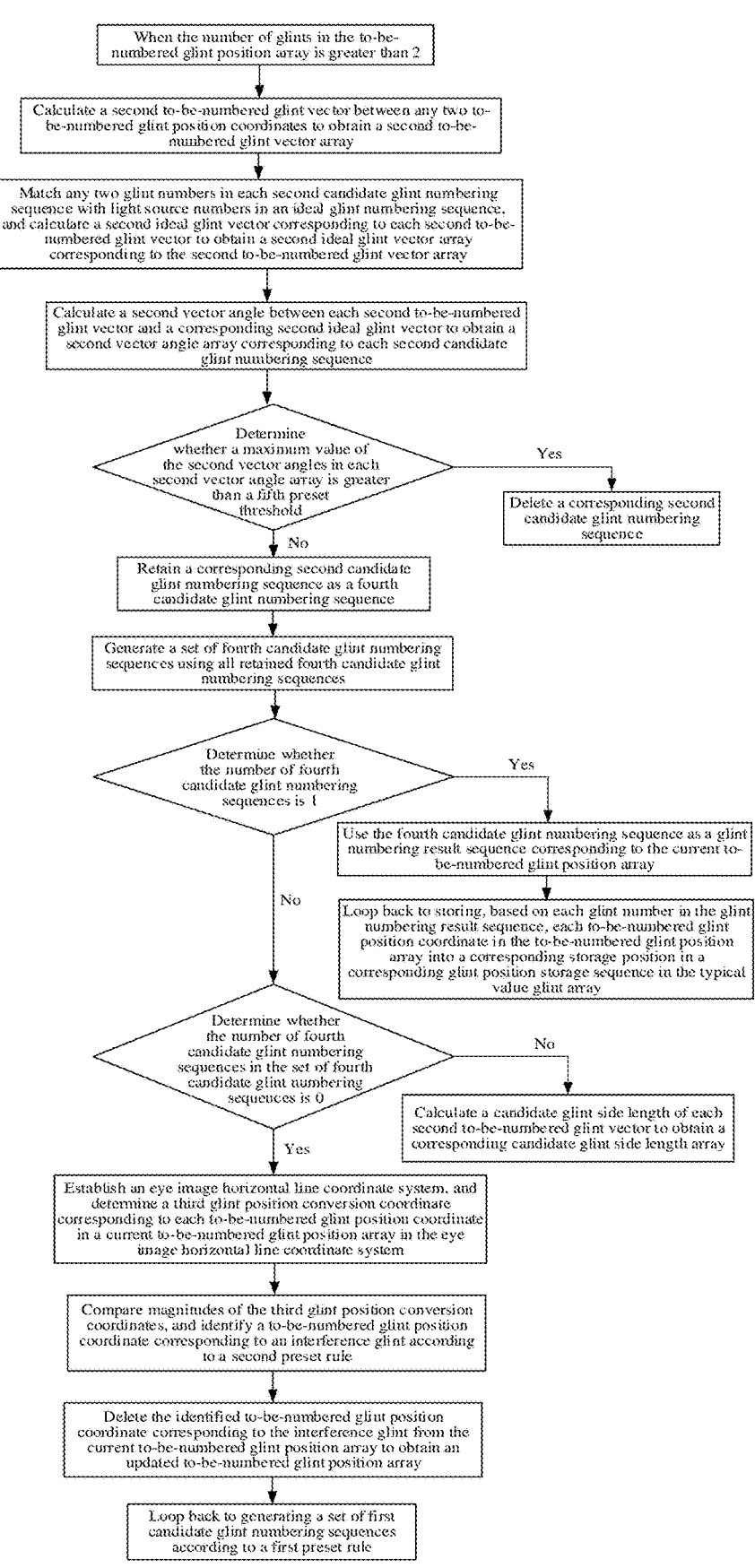
Figure 12:
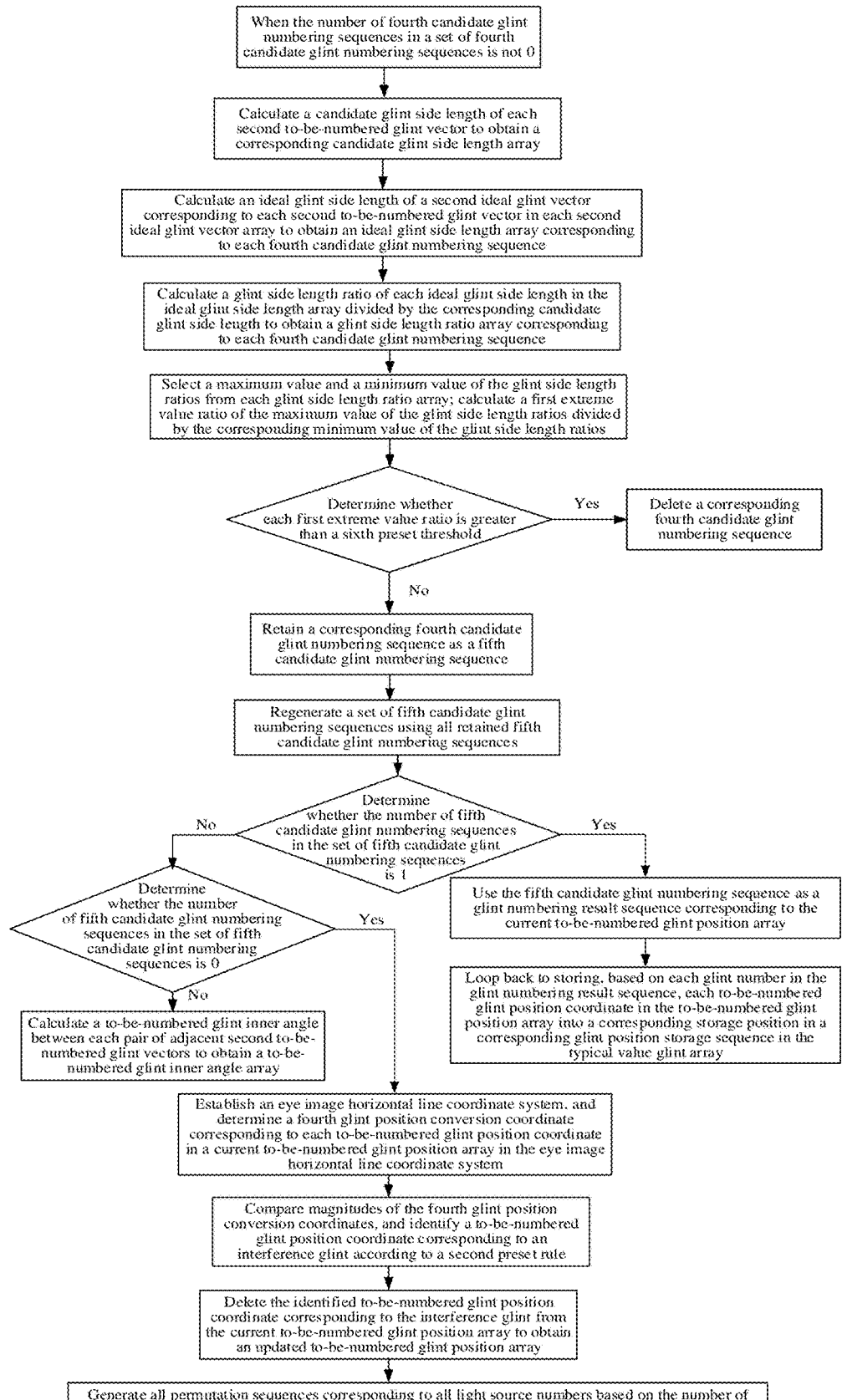
Figure 14:
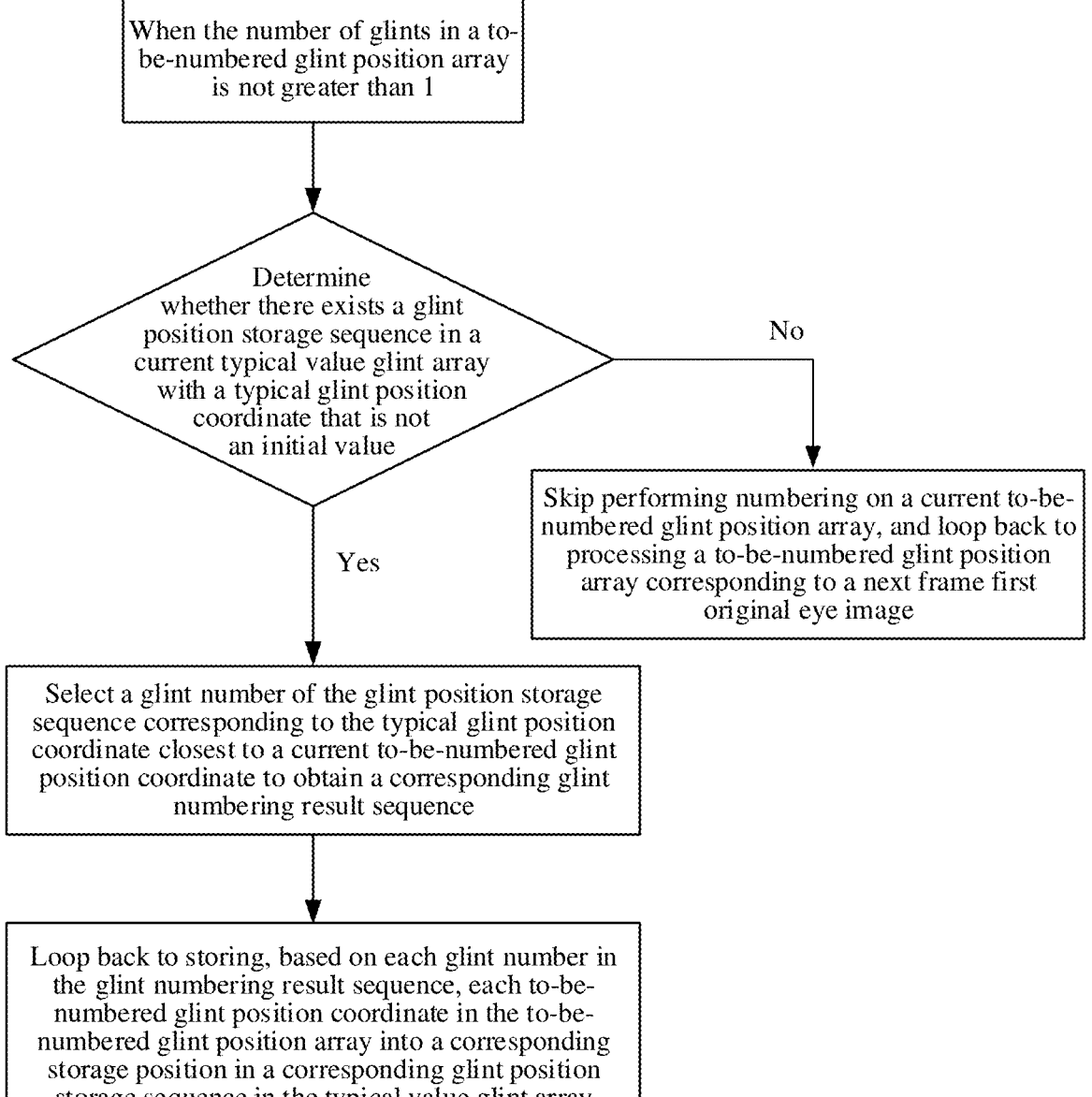

FIG. 7 is a schematic flowchart of constructing storage of to-be-numbered glint position coordinates based on a glint numbering result sequence according to an embodiment of this application;

FIG. 8 is a schematic flowchart of a glint numbering method according to another embodiment of this application;

FIG. 9 is a schematic flowchart of a glint numbering method according to another embodiment of this application;

FIG. 10 is a schematic flowchart of a glint numbering method according to another embodiment of this application;

FIG. 11 is a schematic flowchart of a glint numbering method according to another embodiment of this application;

FIG. 12 is a schematic flowchart of a glint numbering method according to another embodiment of this application;

FIG. 13 is a schematic flowchart of a glint numbering method according to another embodiment of this application; and FIG. 14 is a schematic flowchart of a glint numbering method according to another embodiment of this application.

DESCRIPTION OF EMBODIMENTS

The embodiments of the present invention are described below through specific examples. Those skilled in the art can easily understand other advantages and effects of the present invention from the content disclosed in this specification. Obviously, the described embodiments are only a part of the embodiments of the present invention, not all of them. Based on the embodiments of the present invention, all other embodiments obtained by those skilled in the art without creative efforts fall within the protection scope of the present invention.

The purpose of this application is to: after detecting glint positions on an original eye image to obtain a glint position array, use a glint position array as a to-be-numbered glint position array, and address how to number the glints and ensure the accuracy of the numbering results for the to-be-numbered glint position array.

Figure 1:
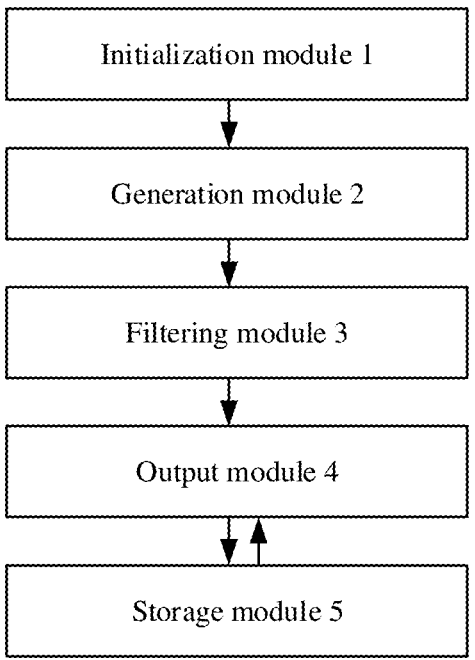
FIG. 1 is a schematic diagram of a logical structure of a glint numbering system according to an embodiment of this application.

To solve the above technical problem, as shown in FIG. 1, an embodiment of this application provides a glint numbering system. The system is used to implement interference glint screening.

Specifically, a glint numbering system provided in this embodiment of this application includes: an initialization module 1, a generation module 2, a filtering module 3, and an output module 4.

Further, the initialization module 1 is configured to perform initialization detection on ideal glint position coordinates for each light source in a light source group to generate a sorted ideal glint position array and a corresponding ideal glint numbering sequence.

Further, the generation module 2 is configured to receive a sorted to-be-numbered glint position array and generate a set of first candidate glint numbering sequences according to a first preset rule.

Further, the filtering module 3 is configured to perform the following steps: determining whether the number of glints in the to-be-numbered glint position array is greater than 1; when the number of glints in the to-be-numbered glint position array is greater than 1, calculating a first to-be-numbered glint vector between coordinates of a pair of adjacent to-be-numbered glint positions to obtain a first to-be-numbered glint vector array; matching each pair of adjacent glint numbers in each first candidate glint numbering sequence with light source numbers in the ideal glint numbering sequence, and calculating a corresponding first ideal glint vector for each first to-be-numbered glint vector to obtain a first ideal glint vector array corresponding to each first to-be-numbered glint vector array; calculating a first vector angle between each first to-be-numbered glint vector and a corresponding first ideal glint vector to obtain a first vector angle array corresponding to each first candidate glint numbering sequence; determining whether a maximum value of the first vector angles in each first vector angle array is greater than a first preset threshold; when the maximum value of the first vector angles in a current first vector angle array is greater than the first preset threshold, deleting a corresponding first candidate glint numbering sequence; when the maximum value of the first vector angles in the current first vector angle array is less than or equal to the first preset threshold, retaining a corresponding first candidate glint numbering sequence as a second candidate glint numbering sequence; and generating a set of second candidate glint numbering sequences using all retained second candidate glint numbering sequences.

Further, the output module 4 is configured to determine whether the number of second candidate glint numbering sequences is 1; and when the number of second candidate glint numbering sequences is 1, using the second candidate glint numbering sequence as a glint numbering result sequence corresponding to the current to-be-numbered glint position array.

Further, the glint numbering system disclosed in this embodiment of this application includes: a storage module 5 configured to perform the following steps: sequentially assigning a storage number for a glint position storage sequence corresponding to each light source using each light source number in a light source group; setting an initial value for each glint position storage sequence to construct a typical value glint array; storing, based on each glint number in the glint numbering result sequence, each to-be-numbered glint position coordinate in the to-be-numbered glint position array into a corresponding storage position in a corresponding glint position storage sequence in the typical value glint array; and calculating, for each glint position storage sequence, an average value/median value/weighted sum value of all stored values as a corresponding typical glint position coordinate.

As compared with the prior art, in the glint numbering system provided in this embodiment of this application, an ideal glint position array and corresponding ideal glint numbering sequence for each light source are obtained through initialization detection; then a set of first candidate glint numbering sequences is generated for a to-be-numbered glint position array. When the number of glints is greater than 1, the to-be-numbered glint position coordinates and the ideal glint position coordinates are vectorized, a first to-be-numbered glint vector between coordinates of a pair of adjacent to-be-numbered glint positions and a first vector angle between the first to-be-numbered glint vector and a corresponding first ideal glint vector are calculated, and the first candidate glint numbering sequence is filtered to obtain a glint numbering result sequence. In embodiments of this application, light source numbering for each glint in glint detection through vectorized comparison is achieved, ensuring accuracy of glint numbering results.

Corresponding to the glint numbering system disclosed above, an embodiment of this application further discloses a glint numbering method. The glint numbering method disclosed in this embodiment of this application is described in detail below in conjunction with the glint numbering system described above.

Figure 2:
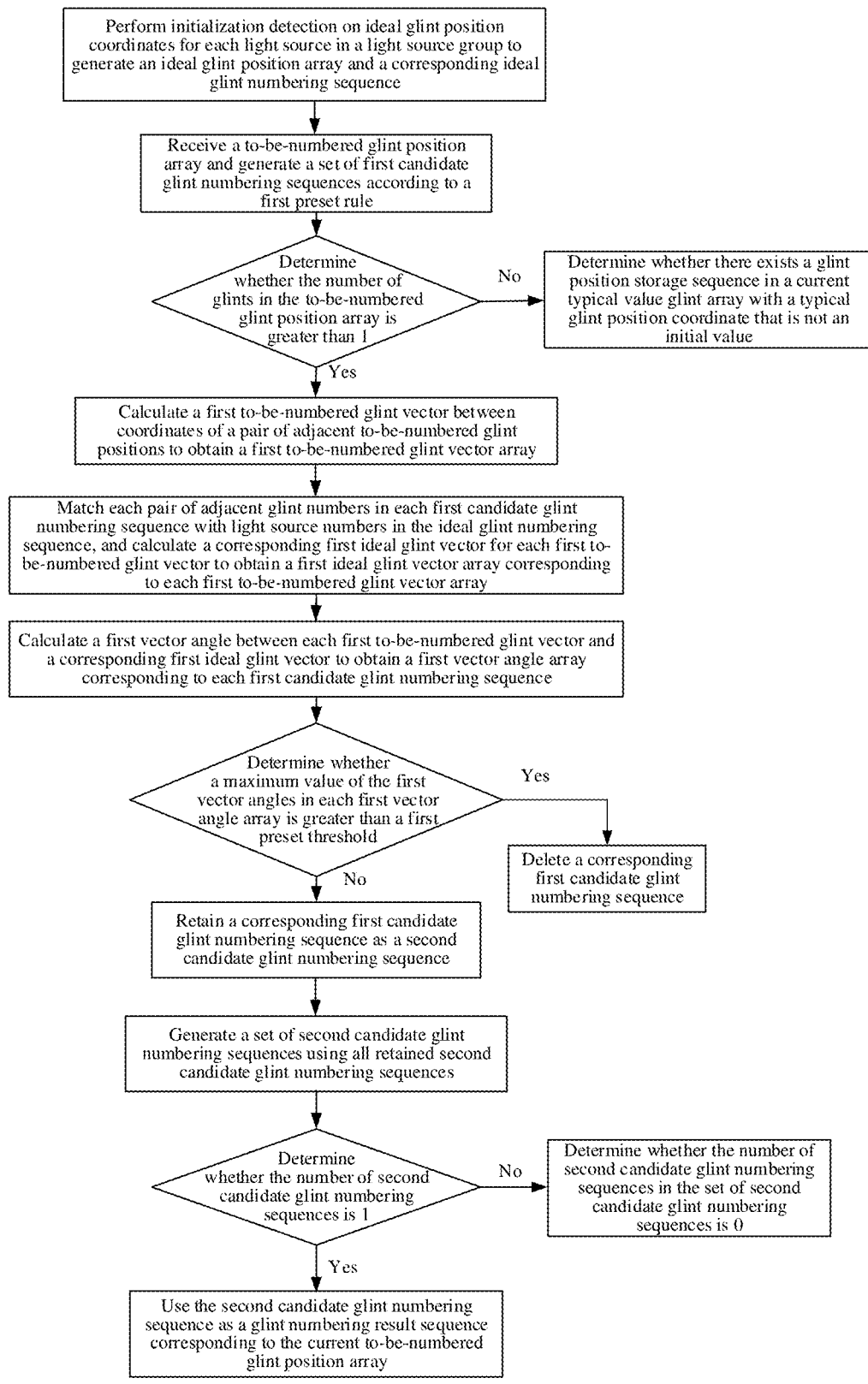
FIG. 2 is a schematic flowchart of a glint numbering method according to an embodiment of this application.

As shown in FIG. 2, the specific steps of a glint numbering method provided in this embodiment of this application are described in detail below.

The initialization module 1 performs initialization detection on ideal glint position coordinates for each light source in a light source group to generate a sorted ideal glint position array and a corresponding ideal glint numbering sequence.

In an embodiment of this application, the ideal glint position coordinates for each light source may be obtained from a single frame of an original eye image, where the original eye image is a grayscale image of the eye captured by a camera. For example, a target person may wear a head-mounted display device, with a predetermined number of light sources arranged near the optical lenses of the head-mounted display device for the left and right eyes, respectively. The predetermined number is 8 or 10, such that 8 or 10 light sources are arranged in a circle around the optical lenses for the left eye, with a camera located directly below or diagonally below the optical lenses for the left eye, near the cheek. Similarly, 8 or 10 light sources are arranged in a circle around the optical lenses for the right eye, with a camera located directly below or diagonally below the optical lenses for the right eye, near the cheek. An original eye image as described above can be obtained by capturing an eye image for a single target human eye (left or right).

Corresponding glints on the original eye image are detected to obtain their positions. It is required that all glints formed by the light sources appear on the cornea in the original eye image. For example, if a light source group has a total of 8 light sources, the original eye image must have 8 correct glints, and 8 glint position coordinates thus obtained are the glint position coordinates.

Another original eye image is captured with a light source covered by opaque tape. Assuming that light source 1 is covered, the glint present in the first original eye image but absent in the second original eye image can be identified as glint number 1. Slight differences exist in eye images captured from a same person at different times, but with consistent glint position distribution trends. Therefore, correct ideal glint position coordinates and corresponding light source numbers for each light source can be effectively obtained by comparing the two original eye images. Thus, the ideal glint position coordinates for other light sources and their corresponding light source numbers can be identified sequentially. The obtained ideal glint position coordinates are sequentially associated with the light source numbers in a clockwise or counterclockwise order to generate an ideal glint position array and a corresponding ideal glint numbering sequence.

Taking a light source group with 8 light sources as an example, the ideal glint position array obtained through the initialization detection described above is denoted as U_idea, where a size N of the array U_idea is the number of glints, that is, N equals 8. In this case, the ideal glint numbering sequence corresponding to the ideal glint position array U_idea is [1 2 3 4 5 6 7 8], meaning that the number of the i-th ideal glint position coordinate U_idea(i) is i.

The generation module 2 receives a sorted to-be-numbered glint position array and generates a set of first candidate glint numbering sequences according to a first preset rule.

In this embodiment of this application, the to-be-numbered glint position coordinates in the received to-be-numbered glint position array are also sorted in a clockwise or counterclockwise order, and the ordering is consistent with that of the ideal glint position coordinates in the ideal glint position array. Further, the first preset rule is to generate all non-repetitive permutation sequences corresponding to all light source numbers based on the number of glints in the to-be-numbered glint position array, and store them as first candidate glint numbering sequences to form a set of first candidate glint numbering sequences. In addition, the above permutation sequences are sorted in a clockwise or counterclockwise order.

Further, the above steps specifically include: taking all light source numbers as the basis, and following the same ordering as in the initialization detection, generating all non-repetitive permutation sequences of light source numbers with the same count as the number of glints corresponding to the to-be-numbered glint position array, to serve as the first candidate glint numbering sequences. For example, with 8 light sources and a clockwise ordering, the to-be-numbered glint position array is denoted as glints, a corresponding first candidate glint numbering sequence is denoted as glints_id, and the number of glints corresponding to the to-be-numbered glint position array is denoted as n. When the number of glints n is 1, a total of 8 non-repetitive first candidate glint numbering sequences are generated, namely [1], [2], [3], [4], [5], [6], [7], [8]. When the number of glints n is 2, 56 non-repetitive first candidate glint numbering sequences are generated, such as [1,2], [1,5], [2,1], [2,8], and [7,1], where no light source number appears twice in each first candidate glint numbering sequence. When the number of glints n is 3, only ordered numbering sequences are generated, also sorted in a clockwise order, and in a same first candidate glint numbering sequence, a same light source number does not appear twice. In addition, the (i+1)-th light source number glints_id(i+1) is greater than the i-th light source number glints_id(i), or only one instance is allowed in a first candidate glint numbering sequence where the (i+1)-th light source number glints_id (i+1) is less than the i-th light source number glints_id(i), where i<n. Taking N=8 and n=6 as an example, the generated first candidate glint numbering sequences such as [1 3 4 5 6 7] and [3 4 5 6 7 8] have the (i+1)-th light source number glints_id(i+1) greater than the i-th light source number glints_id(i). For generated first candidate glint numbering sequences such as [5 6 7 8 1 2], [4 5 6 7 1 3], and [8 1 2 3 4 5], there is only one instance where the (i+1)-th light source number glints_id(i+1) is less than the i-th light source number glints_id(i), and the rest satisfy that the (i+1)-th light source number glints_id(i+1) is greater than the i-th light source number glints_id(i). All first candidate glint numbering sequences generated according to the above method are stored in the structure possibility[n].sequence, obtaining the set of first candidate glint numbering sequences for n to-be-numbered glints.

The filtering module 3 performs the following steps: determining whether the number of glints in the to-be-numbered glint position array is greater than 1; when the number of glints in the to-be-numbered glint position array is greater than 1, calculating a first to-be-numbered glint vector between coordinates of a pair of adjacent to-be-numbered glint positions to obtain a first to-be-numbered glint vector array; matching each pair of adjacent glint numbers in each first candidate glint numbering sequence with light source numbers in the ideal glint numbering sequence, and calculating a corresponding first ideal glint vector for each first to-be-numbered glint vector to obtain a first ideal glint vector array corresponding to each first to-be-numbered glint vector array; calculating a first vector angle between each first to-be-numbered glint vector and a corresponding first ideal glint vector to obtain a first vector angle array corresponding to each first candidate glint numbering sequence; determining whether a maximum value of the first vector angles in each first vector angle array is greater than a first preset threshold; when the maximum value of the first vector angles in a current first vector angle array is greater than the first preset threshold, deleting a corresponding first candidate glint numbering sequence; when the maximum value of the first vector angles in the current first vector angle array is less than or equal to the first preset threshold, retaining a corresponding first candidate glint numbering sequence as a second candidate glint numbering sequence; generating a set of second candidate glint numbering sequences using all retained second candidate glint numbering sequences; and determining whether the number of second candidate glint numbering sequences is 1; and when the number of second candidate glint numbering sequences is 1, the output module 4 uses the second candidate glint numbering sequence as a glint numbering result sequence corresponding to the current to-be-numbered glint position array.

When the number of glints in the input to-be-numbered glint position array is greater than 1, taking one first candidate glint numbering sequence glints_id=[2 4 5 6] in case of n=4 as an example, the sequence indicates that the light source number corresponding to the i-th to-be-numbered glint position coordinate is glints_id(i). For example, the glint position coordinate at glints_id(2) corresponds to light source 4, and the glint position coordinate at glints_id(4) corresponds to light source 6. Let the first to-be-numbered glint vector array be denoted as u_vec. When i<n, the i-th first to-be-numbered glint vector u_vec(i) is calculated according to the formula u_vec(i)=glints(i+1)−glints(i); when i=n, the i-th first to-be-numbered glint vector u_vec(i) is calculated using the following formula: u_vec(i)=glints(1)—glints(n); when i=n, u_vec(i) is calculated as: u_vec(i)=glints(1)—glints(n). Taking glints_id=[2 4 5 6] as an example, the obtained first to-be-numbered glint vector array u_vec=[glints(4)−glints(2), glints(5)−glints(4), glints(6)−glints(5), glints(2)−glints(6)].

Taking the first to-be-numbered glint vector glints(4)−glints(2) from the obtained first to-be-numbered glint vector array u_vec-[glints(4)−glints(2), glints(5)−glints(4), glints(6)−glints(5), glints(2)−glints(6)] as an example, the middle light source numbers "2 and 4" in the ideal glint numbering sequence corresponding to two adjacent glint numbers "2 and 4" in the first candidate glint numbering sequence are obtained by performing the matching, and the corresponding first ideal glint vector U_idea_vec is calculated using the following formula: U_idea_vec=U_idea(4)−U_idea(2). In this way, the first ideal glint vectors corresponding to the other first to-be-numbered glint vectors are calculated sequentially according to the above steps, obtaining a first ideal glint vector array corresponding to each first to-be-numbered glint vector array.

Let the first vector angle between the first to-be-numbered glint vector and the corresponding first ideal glint vector be denoted as angle, for a possible first candidate glint numbering sequence glints_id, the corresponding first vector angles angle(i) are calculated using the formula angle(i)=anglebetween(u_vec(i), U_idea_vec(i)), thus obtaining a first vector angle array corresponding to each first candidate glint numbering sequence. Then, a maximum value of the first vector angles corresponding to a possible first candidate glint numbering sequence glints_id is obtained, that is, angle_max=max(angle). If the maximum value of the first vector angles angle_max is greater than the first preset threshold Angle_MAX, the first candidate glint numbering sequence is excluded, as it is considered unlikely to be the glint numbering sequence corresponding to the current to-be-numbered glint position array. If the maximum value of the first vector angles angle_max is less than or equal to the first preset threshold Angle_MAX, the first candidate glint numbering sequence is saved in candidate_angle as a second candidate glint numbering sequence. In this embodiment of this application, the first preset threshold Angle_MAX may be set to 8 degrees, a value in the teens of degrees, or a value in the twenties of degrees, for example, setting the first preset threshold Angle_MAX to 25°.

As compared with the prior art, in the glint numbering method provided in this embodiment of this application, an ideal glint position array and corresponding ideal glint numbering sequence for each light source are obtained through initialization detection; then a set of first candidate glint numbering sequences is generated for a to-be-numbered glint position array. When the number of glints is greater than 1, the to-be-numbered glint position coordinates and the ideal glint position coordinates are vectorized, a first to-be-numbered glint vector between coordinates of a pair of adjacent to-be-numbered glint positions and a first vector angle between the first to-be-numbered glint vector and a corresponding first ideal glint vector are calculated, and the first candidate glint numbering sequence is filtered to obtain a glint numbering result sequence. In embodiments of this application, light source numbering for each glint in glint detection through vectorized comparison is achieved, ensuring accuracy of glint numbering results.

Figure 3:
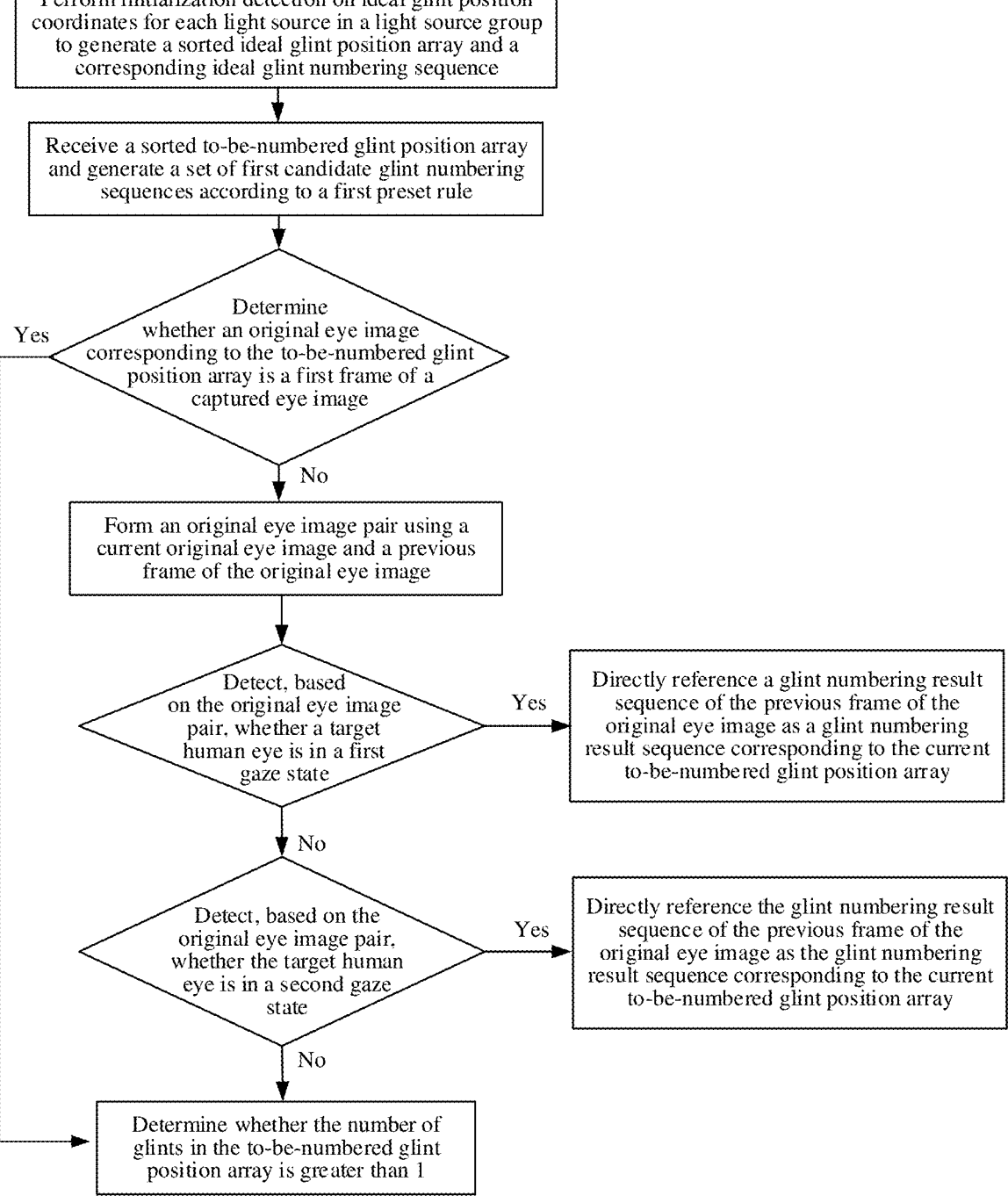
FIG. 3 is a schematic flowchart of a glint numbering method according to another embodiment of this application.

Referring to FIG. 3, before determining whether the number of glints in the to-be-numbered glint position array is greater than 1, the glint numbering method disclosed in this application further includes the following steps performed by the filtering module 3: determining whether an original eye image corresponding to the to-be-numbered glint position array is a first frame of a captured eye image; when the original eye image corresponding to the to-be-numbered glint position array is not the first frame of the captured eye image, forming an original eye image pair using a current original eye image and a previous frame of the original eye image; detecting, based on the original eye image pair, whether a target human eye is in a first gaze state; when the target human eye is in the first gaze state, directly referencing, by the output module 4, a glint numbering result sequence of the previous frame of the original eye image as the glint numbering result sequence corresponding to the current to-be-numbered glint position array.

Figure 4:
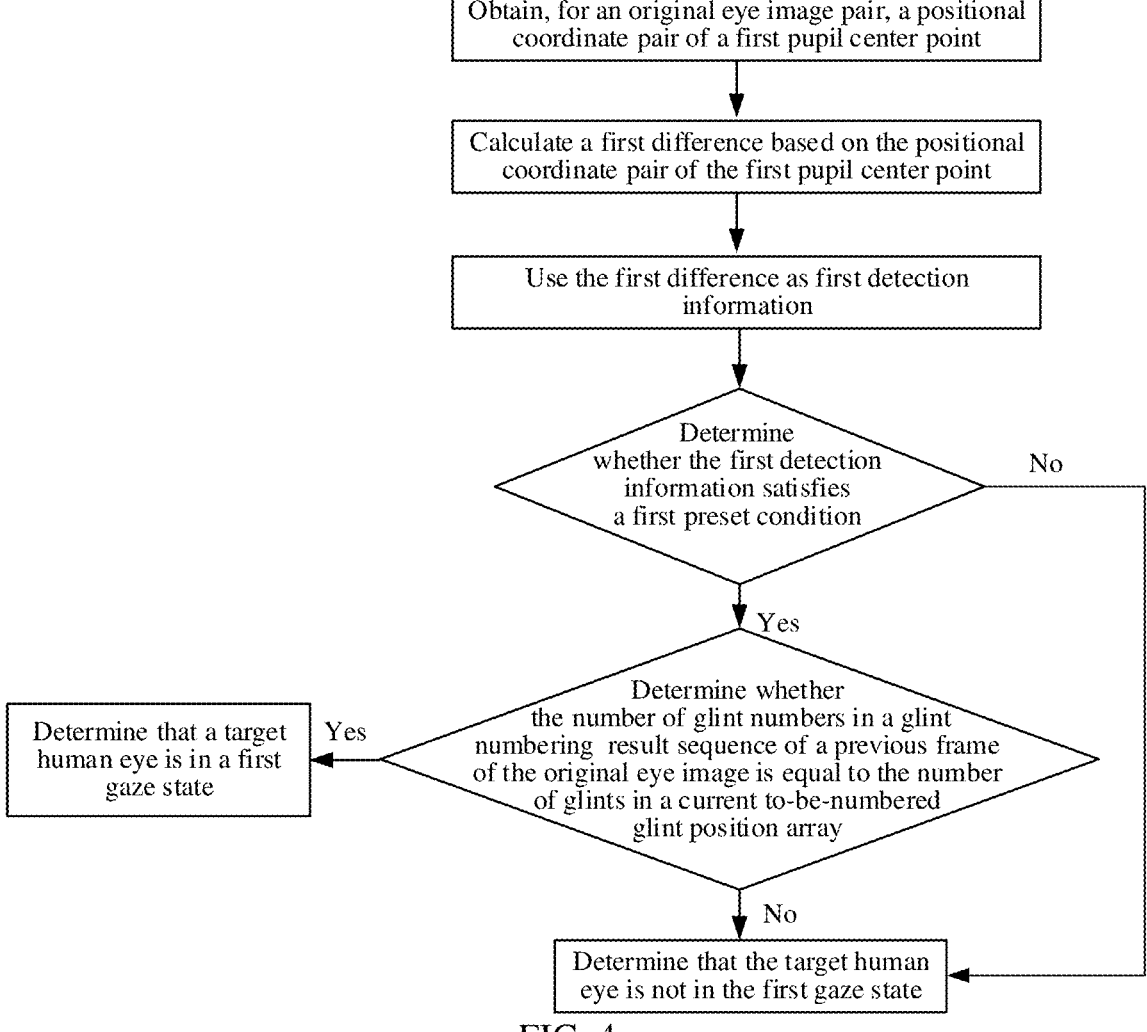
FIG. 4 is a schematic flowchart of detecting whether a target human eye is in a first gaze state based on an original eye image pair according to an embodiment of this application.

Referring to FIG. 4, in an embodiment of this application, the detecting, based on the original eye image pair, whether the target human eye is in the first gaze state specifically includes the following steps: obtaining, for the original eye image pair, a positional coordinate pair of a first pupil center point; calculating a first difference based on the positional coordinate pair of the first pupil center point; using the first difference as first detection information; determining whether the first detection information satisfies a first preset condition, where the first preset condition is that the first difference is less than a second preset threshold; when the first detection information satisfies the first preset condition, determining whether the number of glint numbers in the glint numbering result sequence of the previous frame of the original eye image is equal to the number of glints in the current to-be-numbered glint position array; when the number of glint numbers in the glint numbering result sequence of the previous frame of the original eye image is equal to the number of glints in the current to-be-numbered glint position array, determining that the target human eye is in the first gaze state; when the first detection information does not satisfy the first preset condition, or the number of glint numbers in the glint numbering result sequence of the previous frame of the original eye image is not equal to the number of glints in the current to-be-numbered glint position array, determining that the target human eye is not in the first gaze state.

In this embodiment of this application, in the above original eye image pair, the pupil center point position coordinate of the current frame of the original eye image is denoted as v, and the pupil center point position coordinate of the previous frame of the original eye image is denoted as v_last. The first difference v_shift is calculated using the following formula: v_shift=abs (v−v_last). In this embodiment, the second preset threshold is denoted as v_max, for example, the second preset threshold v_max may be set to 1.8. Thus, if the first difference v_shift is less than 1.8, then it is further determined whether the number of glint numbers in the glint numbering result sequence of the previous frame of the original eye image is equal to the number of glints in the current to-be-numbered glint position array; if they are equal, it is considered that the target human eye of the user is in the first gaze state.

When the target human eye is not in the first gaze state, it is detected based on the original eye image pair whether the target human eye is in a second gaze state. When the target human eye is in the second gaze state, the glint numbering result sequence of the previous frame of the original eye image is directly referenced as the glint numbering result sequence corresponding to the current to-be-numbered glint position array.

Figure 5:
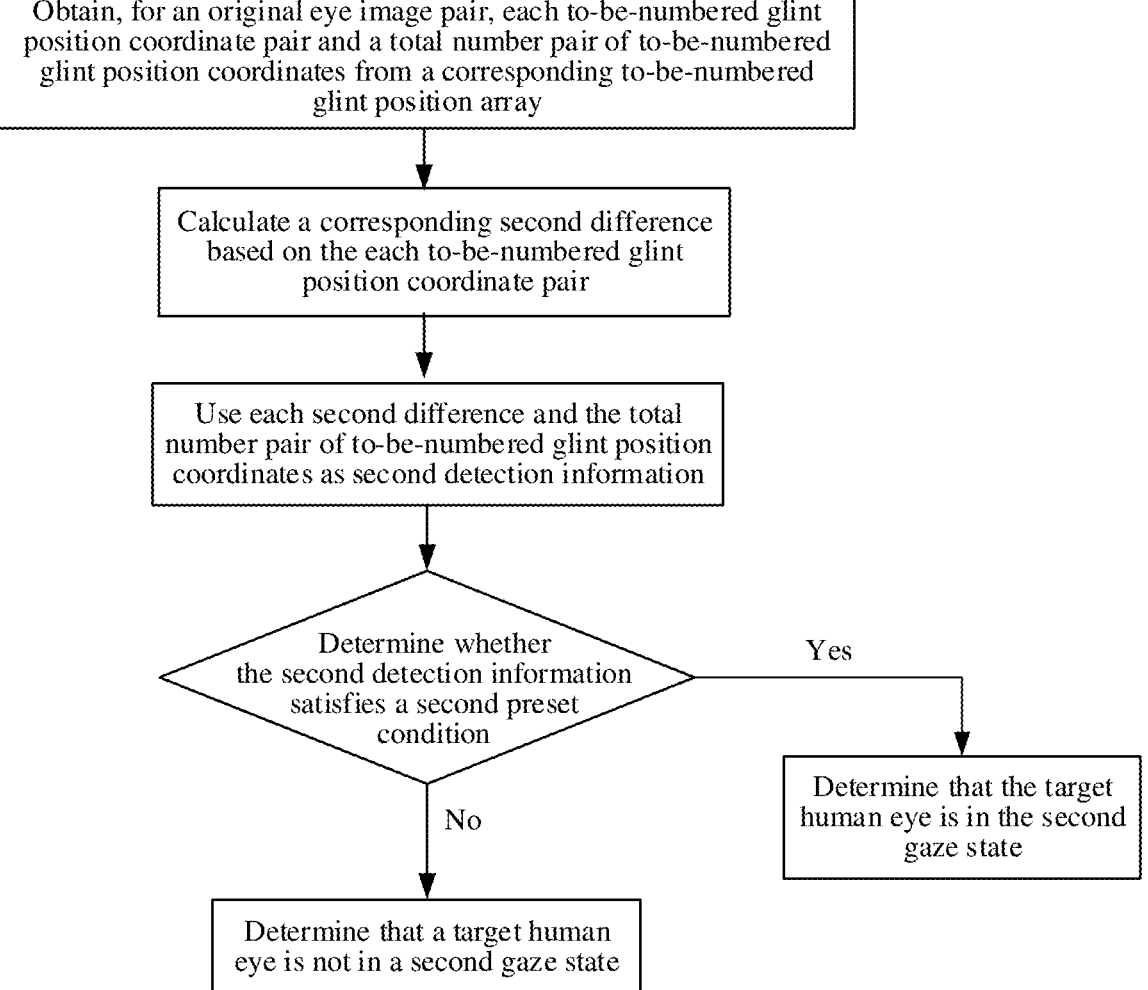
FIG. 5 is a schematic flowchart of detecting whether a target human eye is in a second gaze state based on an original eye image pair according to another embodiment of this application.

Referring to FIG. 5, in an embodiment of this application, the detecting, based on the original eye image pair, whether the target human eye is in the second gaze state specifically includes the following steps: obtaining, for the original eye image pair, each to-be-numbered glint position coordinate pair and a total number pair of to-be-numbered glint position coordinates from a corresponding to-be-numbered glint position array; calculating a corresponding second difference based on the each to-be-numbered glint position coordinate pair; using each second difference and the total number pair of to-be-numbered glint position coordinates as second detection information; determining whether the second detection information satisfies a second preset condition, where the second preset condition is that each second difference is less than a third preset threshold and that two total numbers of to-be-numbered glint positional coordinates in the total number pair of to-be-numbered glint position coordinates are identical; when the second detection information satisfies the second preset condition, determining that the target human eye is in the second gaze state; and when the second detection information does not satisfy the second preset condition, determining that the target human eye is not in the second gaze state.

In the above original eye image pair, the to-be-numbered glint position array of the current frame of the original eye image is denoted here as u, and the to-be-numbered glint position array of the previous frame of the original eye image is denoted as u_last. If the total number of to-be-numbered glint position coordinates corresponding to the current frame of the original eye image is equal to the total number of to-be-numbered glint position coordinates corresponding to the previous frame of the original eye image, both being n, and for the i-th to-be-numbered glint position coordinate pair [u(i), u_last(i)], the i-th second difference u_shift(i) is calculated using the following formula: u_shift(i)=abs (u(i)−u_last(i)). In this embodiment, a third preset threshold is denoted as u_max, for example, the third preset threshold u_max may be set to 2. When each second difference u_shift(i) is less than 2, it is considered that the target human eye of the user is in the second gaze state.

As described above, before formally starting to number the glints, it can first be determined whether the original eye image corresponding to the to-be-numbered glint position array is a first frame of a captured eye image, and whether the target human eye is in the first gaze state or the second gaze state, to determine whether the glint numbering process can be simplified. If the original eye image corresponding to the to-be-numbered glint position array is not the first frame of the captured eye image, and the target human eye is in the first gaze state or the second gaze state, the glint numbering result sequence of the previous frame of the original eye image can be directly referenced as the glint numbering result sequence corresponding to the current to-be-numbered glint position array, thus completing the glint numbering with minimal time consumption.

When the original eye image corresponding to the to-be-numbered glint position array is the first frame of the captured eye image, or the target human eye is not in the second gaze state, it is further determined whether the number of glints in the to-be-numbered glint position array is greater than 1.

Referring to FIG. 6, in an embodiment of this application, when the number of second candidate glint numbering sequences is not 1, the following steps are performed by the filtering module 3: determining whether the number of second candidate glint numbering sequences in the set of second candidate glint numbering sequences is 0; when the number of second candidate glint numbering sequences in the set of second candidate glint numbering sequences is 0, establishing an eye image horizontal line coordinate system, and determining a first glint position conversion coordinate corresponding to each to-be-numbered glint position coordinate in a current to-be-numbered glint position array in the eye image horizontal line coordinate system; comparing magnitudes of the first glint position conversion coordinates, and identifying a to-be-numbered glint position coordinate corresponding to an interference glint according to a second preset rule; and deleting the identified to-be-numbered glint position coordinate corresponding to the interference glint from the current to-be-numbered glint position array to obtain an updated to-be-numbered glint position array, and looping back to generating a set of first candidate glint numbering sequences according to a first preset rule.

In this embodiment of this application, the step of establishing an eye image horizontal line coordinate system specifically includes: establishing a three-dimensional world coordinate system based on a target human face; detecting a first left eye center position coordinate and a first right eye center position coordinate of the target human face in the three-dimensional world coordinate system; converting the first left eye center position coordinate and the first right eye center position coordinate to a camera coordinate system of the original eye image to obtain a corresponding second left eye center position coordinate and second right eye center position coordinate; calculating a slope of the eye image horizontal line using the second left eye center position coordinate and the second right eye center position coordinate, where the eye image horizontal line is a projection line connecting the left eye center and the right eye center of the target human face in the camera coordinate system; and selecting any point in the camera coordinate system as the origin, and determining the coordinate axis direction based on the slope of the eye image horizontal line to establish the eye image horizontal line coordinate system.

As described above, the establishment of the eye image horizontal line coordinate system requires calculating the slope of the horizontal line connecting the two eyes in the three-dimensional world coordinate system as it appears in the eye image. The three-dimensional world coordinate system takes the bridge of the target human face as the origin (0,0,0), with the X-axis representing the horizontal direction, the Y-axis representing the vertical direction, and the Z-axis representing the direction perpendicular to the plane formed by the X-axis and Y-axis. The first left eye center position coordinate and the first right eye center position coordinate may be denoted as $E_{left}$ and $E_{right}$, respectively. For example, $E_{left}=(-31.5,0,0)$, $E_{right}=(31.5,0,0)$. The establishment of this eye image horizontal line coordinate system is based on the assumption that the user is normally wearing the head-mounted display device, where the line connecting the three-dimensional position coordinates of the left eye center and the right eye center is parallel to the line connecting the optical centers of the left and right physical lenses of the head-mounted display device, with only a translational relationship between the former and the latter (ignoring the length of the line segments). The first left eye center position coordinate and the first right eye center position coordinate are converted to the camera coordinate system and transformed into image pixel coordinates, obtaining corresponding second left eye center position coordinate and second right eye center position coordinate, denoted as $P_{left}$ and $P_{right}$, respectively. The line connecting the second left eye center position coordinate $P_{left}$ and the second right eye center position coordinate $P_{right}$ is denoted as $P_lP_r$, which represents a line segment on the original eye image from projecting the line $E_lE_r$ connecting the first left eye center position coordinate $E_{left}$ and the first right eye center position coordinate $E_{right}$ in the three-dimensional world coordinate system.

In the layout of the usage scenario described above in this embodiment of this application, the second left eye center position coordinate $P_{left}$ is $(X\_P_{left}, Y\_P_{left})$, and the second right eye center position coordinate $P_{right}$ is $(X\_P_{right}, Y\_P_{right})$. The slope k of the line $P_lP_r$ connecting the second left eye center position coordinate $P_{left}$ and the second right eye center position coordinate $P_{right}$ is calculated using the following formula:

$$k = \left|Y\_P_{right} - Y\_P_{left}\right| / \left|X\_P_{right} - X\_P_{left}\right|.$$

Thus, the line $E_lE_r$ connecting the first left eye center position coordinate $E_{left}$ and the first right eye center position coordinate $E_{right}$ in the three-dimensional world coordinate system can be represented in the camera coordinate system of the original eye image as a line segment with slope k. Based on the camera coordinate system of the original eye image, a new eye image horizontal line coordinate system is established. This eye image horizontal line coordinate system may select any point in the camera coordinate system of the original eye image as the origin. For example, the eye image horizontal line coordinate system may select a following point as the origin: the center point of the original eye image, the pupil center position of the original eye image, the origin (0,0) of the pixel coordinate system of the original eye image, or a point on the line $P_lP_r$ connecting the second left eye center position coordinate $P_{left}$ and the second right eye center position coordinate $P_{right}$. The eye image horizontal line is defined as a line segment y=kx+b with slope k in the original eye image coordinate system (camera coordinate system of the original eye image) and serves as the X-axis direction, where the value of b depends on the origin of the new eye image horizontal line coordinate system.

In this embodiment of this application, the second preset rule includes: identifying to-be-numbered glint position coordinates corresponding to maximum or minimum values of the first glint position conversion coordinates as the interference glint position coordinates.

The following provides an example in the specific usage scenario described above. As mentioned, taking the original eye image captured for the left eye as an example, the positive direction of the X-axis of the eye image horizontal line coordinate system is the direction of the vector from the second right eye center position coordinate $P_{right}$ to the second left eye center position coordinate $P_{left}$. By converting each to-be-numbered glint position coordinate with an interference glint into the new eye image horizontal line coordinate system, the x-value magnitudes of the corresponding first glint position conversion coordinates in the new eye image horizontal line coordinate system can be used to determine the most likely interference glint formed by a light source on the opposite side. Taking the original eye image captured for the left eye as an example, the specific rule is that a larger x-value of the corresponding first glint position conversion coordinate indicates a location closer to the other eye (right eye), and the to-be-numbered glint position coordinate corresponding to the maximum x-value of the first glint position conversion coordinates is most likely the interference glint position coordinate formed by a light source on the opposite side, which is deleted from the current to-be-numbered glint position array.

In addition, in an example in the specific usage scenario described above, as mentioned, taking the original eye image captured for the right eye as an example, the positive direction of the X-axis of the eye image horizontal line coordinate system is the direction of the vector from the second right eye center position coordinate $P_{right}$ to the second left eye center position coordinate $P_{left}$. By converting each to-be-numbered glint position coordinate with an interference glint into the new eye image horizontal line coordinate system, the x-value magnitudes of the corresponding first glint position conversion coordinates in the new eye image horizontal line coordinate system may be used to determine the most likely interference glint formed by a light source on the opposite side. Taking the original eye image captured for the right eye as an example, the specific rule is that a smaller x-value of the corresponding first glint position conversion coordinate indicates a location closer to the other eye (left eye), and the to-be-numbered glint position coordinate corresponding to the minimum x-value of the first glint position conversion coordinates is most likely the interference glint position coordinate formed by a light source on the opposite side, which is deleted from the current to-be-numbered glint position array.

Similarly, taking the original eye image captured for the left eye as an example, the positive direction of the Y-axis of the eye image horizontal line coordinate system is the direction of the vector from the second right eye center position coordinate $P_{right}$ to the second left eye center position coordinate $P_{left}$. The second preset rule specifically states that a larger y-value of the corresponding first glint position conversion coordinate indicates a location closer to the other eye (right eye), and the to-be-numbered glint position coordinate corresponding to the maximum y-value of the first glint position conversion coordinates is most likely the interference glint position coordinate formed by a light source on the opposite side. Taking the original eye image captured for the right eye as an example, the positive direction of the Y-axis of the eye image horizontal line coordinate system is the direction of the vector from the second right eye center position coordinate $P_{right}$ to the second left eye center position coordinate $P_{left}$. The second preset rule specifically states that a smaller y-value of the corresponding first glint position conversion coordinate indicates a location closer to the other eye (left eye), and the to-be-numbered glint position coordinate corresponding to the minimum y-value of the first glint position conversion coordinates is most likely the interference glint position coordinate formed by a light source on the opposite side.

Referring to FIG. 7, a glint numbering method disclosed in an embodiment of this application further includes the following steps performed by the storage module 5: sequentially assigning a storage number for a glint position storage sequence corresponding to each light source using each light source number in a light source group; setting an initial value for each glint position storage sequence to construct a typical value glint array; storing, based on each glint number in the glint numbering result sequence, each to-be-numbered glint position coordinate in the to-be-numbered glint position array into a corresponding storage position in a corresponding glint position storage sequence in the typical value glint array; and calculating, for each glint position storage sequence, an average value/median value/weighted sum value of all stored values as a corresponding typical glint position coordinate.

In this embodiment of this application, the purpose of constructing the typical value glint array to store the to-be-numbered glint position coordinates corresponding to each glint number in the glint numbering result sequence is to address the issue on how to implement glint numbering when the number n of glints in the to-be-numbered glint position array glints is less than 3. The typical value glint array is denoted as Ureals, and each glint position storage sequence is denoted as Ureals[i]. With 8 light sources in the light source group, there are 8 glint position storage sequences, namely Ureals[1], Ureals[2], Ureals[3], Ureals[4], Ureals[5], Ureals[6], Ureals[7], and Ureals[8], and the initial value of each glint position storage sequence is set to 0. For example, if the to-be-numbered glint position array glints has four to-be-numbered glint position coordinates, and the final glint numbering result sequence Glints_id is [2 4 5 6], the corresponding to-be-numbered glint position coordinates glints(1), glints(2), glints(3), and glints(4) are stored in the glint position storage sequences Ureals[2], Ureals[4], Ureals[5], and Ureals[6] of the typical value glint array, respectively. The specific implementation of the typical value glint array involves setting N containers in a Ureals container, where N represents the array size of U_idea or the number of glints in the ideal glint position array, and thus the number of infrared light sources in the light source group is also N, with N=1 representing a glint position storage sequence for the glint formed by light source 1. Each Ureals container can be set to have 10 containers for holding to-be-numbered glint position coordinates. For example, Ureals[2] is the storage container for the to-be-numbered glint position coordinates of the glint formed by light source

2, and Ureals[2] can store 10 latest to-be-numbered glint position coordinates for the glint formed by light source 2. An average value/median value/weighted value of all to-be-numbered glint position coordinates of the glint formed by light source 2 in Ureals[2] is taken as the typical glint position coordinate corresponding to the glint formed by light source 2.

Referring to FIG. 8, when the number of second candidate glint numbering sequences in the set of second candidate glint numbering sequences is not 0, the filtering module 3 continues to perform the following steps: determining whether the number of glints in the to-be-numbered glint position array is greater than 2; when the number of glints in the to-be-numbered glint position array is not greater than 2, where the number of glints in the to-be-numbered glint position array is 2, determining whether the glint position storage sequence corresponding to each glint number in each second candidate glint numbering sequence has a typical glint position coordinate that is not an initial value; when the glint position storage sequence corresponding to each glint number in each second candidate glint numbering sequence has a typical glint position coordinate that is not an initial value, sequentially calculating, for each second candidate glint numbering sequence, a third distance between one to-be-numbered glint position coordinate in the to-be-numbered glint position array and the corresponding typical glint position coordinate, and a fourth distance between another to-be-numbered glint position coordinate and the corresponding typical glint position coordinate; using the third distance and the fourth distance as a distance error pair, and forming a distance error pair array corresponding to the set of second candidate glint numbering sequences from the distance error pairs corresponding to individual second candidate glint numbering sequences; using the glint numbers in the second candidate glint numbering sequence corresponding to a maximum value of the third distance and a maximum value of the fourth distance in the distance error pair array as a first glint number and a second glint number, respectively; determining whether the first glint number is equal to the second glint number; and when the first glint number is not equal to the second glint number, comparing the maximum value of the third distance and the maximum value of the fourth distance, deleting the distance error pair corresponding to the larger value from the distance error pair array, deleting the second candidate glint numbering sequence corresponding to the larger value from the set of second candidate glint numbering sequences, and looping back to determining whether the number of second candidate glint numbering sequences is 1.

Referring to FIG. 8, when the first glint number is equal to the second glint number, the filtering module 3 continues to perform the following steps: determining whether the number of current second candidate glint numbering sequences is greater than 2; and when the number of current second candidate glint numbering sequences is greater than 2, deleting the second candidate glint numbering sequence corresponding to the first glint number and the second glint number from the set of second candidate glint numbering sequences, deleting the distance error pair corresponding to the first glint number and the second glint number from the distance error pair array, and looping back to determining whether the number of second candidate glint numbering sequences is 1.

Referring to FIG. 8, when the number of current second candidate glint numbering sequences is not greater than 2, where the number of current second candidate glint numbering sequences is equal to 2, the filtering module 3 continues to perform the following steps: calculating a fifth distance between two to-be-numbered glint position coordinates and a sixth distance between typical glint position coordinates corresponding to two glint numbers in each second candidate glint numbering sequence; calculating a ratio of the fifth distance to the sixth distance to obtain a corresponding first error reference ratio; and retaining a second candidate glint numbering sequence corresponding to a first error reference ratio closest to 1.

Referring to FIG. 8, the output module 4 uses the finally retained second candidate glint numbering sequence as the glint numbering result sequence corresponding to the current to-be-numbered glint position array, and loops back to storing, by the storage module 5 based on each glint number in the glint numbering result sequence, each to-be-numbered glint position coordinate in the to-be-numbered glint position array into the corresponding storage position in a corresponding glint position storage sequence in the typical value glint array.

Referring to FIG. 9, when in each second candidate glint numbering sequence, there exists a glint position storage sequence corresponding to a glint number and having only an initial value, the filtering module 3 performs the following steps: directly calculating a fifth distance between two to-be-numbered glint position coordinates and a seventh distance between two ideal glint position coordinates in the ideal glint position array corresponding to two glint numbers in each second candidate glint numbering sequence; calculating a ratio of the fifth distance to the seventh distance to obtain a corresponding second error reference ratio; calculating an absolute value error between each second error reference ratio and 1; determining whether the absolute value error is greater than a fourth preset threshold, where in this embodiment of this application, the fourth preset threshold may be set to 1.5; when the absolute value error is greater than the fourth preset threshold, deleting a corresponding second candidate glint numbering sequence; when the absolute value error is less than or equal to the fourth preset threshold, retaining a corresponding second candidate glint numbering sequence as a third candidate glint numbering sequence; generating a set of third candidate glint numbering sequences using all retained third candidate glint numbering sequences; and determining whether the number of third candidate glint numbering sequences is 1.

Referring to FIG. 9, when the number of third candidate glint numbering sequences is 1, the output module 4 uses the third candidate glint numbering sequence as the glint numbering result sequence corresponding to the current to-be-numbered glint position array, and loops back to storing, by the storage module 5 based on each glint number in the glint numbering result sequence, each to-be-numbered glint position coordinate in the to-be-numbered glint position array into the corresponding storage position in a corresponding glint position storage sequence in the typical value glint array.

Referring to FIG. 9, when the number of third candidate glint numbering sequences is not 1, the filtering module 3 continues to perform the following steps: determining whether the number of third candidate glint numbering sequences in the set of third candidate glint numbering sequences is 0; when the number of third candidate glint numbering sequences in the set of third candidate glint numbering sequences is 0, establishing an eye image horizontal line coordinate system, and determining a second glint position conversion coordinate corresponding to each to-be-numbered glint position coordinate in a current to-be-numbered glint position array in the eye image horizontal line coordinate system; comparing magnitudes of the second glint position conversion coordinates, and identifying a to-be-numbered glint position coordinate corresponding to an interference glint according to a second preset rule; and deleting the identified to-be-numbered glint position coordinate corresponding to the interference glint from the current to-be-numbered glint position array to obtain an updated to-be-numbered glint position array, and looping back to generating a set of first candidate glint numbering sequences according to a first preset rule.

The specific steps for establishing the eye image horizontal line coordinate system at this point are the same as those for establishing the eye image horizontal line coordinate system when the number of second candidate glint numbering sequences in the set of second candidate glint numbering sequences is 0, and details are not repeated here.

Similarly, in this embodiment of this application, the second preset rule includes: identifying the to-be-numbered glint position coordinate corresponding to the maximum or minimum value of the second glint position conversion coordinates as the interference glint position coordinate. Specifically, depending on the method of establishing the coordinate system, the second preset rule has multiple determination rules. For example, the to-be-numbered glint position coordinate corresponding to the maximum or minimum x-coordinate value of the second glint position conversion coordinates is identified as the interference glint position coordinate, or the to-be-numbered glint position coordinate corresponding to the maximum or minimum y-coordinate value of the second glint position conversion coordinates is identified as the interference glint position coordinate.

Similarly, taking the original eye image captured for the left eye as an example, the positive direction of the X-axis of the eye image horizontal line coordinate system is the direction of the vector from the second right eye center position coordinate $P_{right}$ to the second left eye center position coordinate $P_{left}$. The second preset rule specifically states that a larger x-value of the corresponding second glint position conversion coordinate indicates a location closer to the other eye (right eye), and the to-be-numbered glint position coordinate corresponding to the maximum x-value of the second glint position conversion coordinates is most likely the interference glint position coordinate formed by a light source on the opposite side. Taking the original eye image captured for the right eye as an example, the positive direction of the X-axis of the eye image horizontal line coordinate system is the direction of the vector from the second right eye center position coordinate $P_{right}$ to the second left eye center position coordinate $P_{left}$. The second preset rule specifically states that a smaller x-value of the corresponding second glint position conversion coordinate indicates a location closer to the other eye (left eye), and the to-be-numbered glint position coordinate corresponding to the minimum x-value of the second glint position conversion coordinates is most likely the interference glint position coordinate formed by a light source on the opposite side. Taking the original eye image captured for the left eye as an example, the positive direction of the Y-axis of the eye image horizontal line coordinate system is the direction of the vector from the second right eye center position coordinate $P_{right}$ to the second left eye center position coordinate $P_{left}$. The second preset rule specifically states that a larger y-value of the corresponding second glint position conversion coordinate indicates a location closer to the other eye (right eye), and the to-be-numbered glint position coordinate corresponding to the maximum y-value of the second glint position conversion coordinates is most likely the interference glint position coordinate formed by a light source on the opposite side. Taking the original eye image captured for the right eye as an example, the positive direction of the Y-axis of the eye image horizontal line coordinate system is the direction of the vector from the second right eye center position coordinate $P_{right}$ to the second left eye center position coordinate $P_{left}$. The second preset rule specifically states that a smaller y-value of the corresponding second glint position conversion coordinate indicates a location closer to the other eye (left eye), and the to-be-numbered glint position coordinate corresponding to the minimum y-value of the second glint position conversion coordinates is most likely the interference glint position coordinate formed by a light source on the opposite side.

Referring to FIG. 10, when the number of third candidate glint numbering sequences in the set of third candidate glint numbering sequences is not 0, the filtering module 3 performs the following steps: calculating a second center point position coordinate between two to-be-numbered glint position coordinates and a first pupil center position coordinate of the original eye image; calculating a first center point vector from the first pupil center position coordinate to the second center point position coordinate; calculating, for the set of third candidate glint numbering sequences, a third center point position coordinate between two ideal glint position coordinates corresponding to two glint numbers in each third candidate glint numbering sequence and an ideal pupil center position coordinate between the ideal glint position coordinates; calculating a second center point vector from the ideal pupil center position coordinate to each third center point position coordinate; calculating a third vector angle between the first center point vector and each second center point vector; selecting an absolute value error, a second vector angle, and the third vector angle corresponding to each third candidate glint numbering sequence as first scoring metrics; and assigning a corresponding first preset weight to each first scoring metric, and calculating a first comprehensive score corresponding to each third candidate glint numbering sequence through weighted calculation.

In this embodiment of this application, the first pupil center position coordinate is the position coordinate of the pupil center in the original eye image. The first pupil center position coordinate may be calculated from multiple collected pupil contour point position coordinates in the original eye image. The first comprehensive score is calculated according to the following formula:

$$Score1 = a_1 \cdot \text{ratio\_error} + b_1 \cdot \text{angle\_v} + c_1 \cdot \text{angle\_vec}$$

where Score1 is the first comprehensive score, ratio_error is the absolute value error, angle_v is the second vector angle, angle_vec is the third vector angle, and $a_1$, $b_1$, $c_1$ are the first preset weights corresponding to the absolute value error, the second vector angle, and the third vector angle, respectively. In one embodiment, $a_1$, $b_1$, $c_1$ may be set to 0.5, 0.25, 0.25, respectively.

The output module 4 selects a third candidate glint numbering sequence with the lowest first comprehensive score as the glint numbering result sequence, and loops back to storing, by the storage module 5 based on each glint number in the glint numbering result sequence, each to-be-numbered glint position coordinate in the to-be-numbered glint position array into the corresponding storage position in a corresponding glint position storage sequence in the typical value glint array.

Referring to FIG. 11, when the number of glints in the to-be-numbered glint position array is greater than 2, the filtering module 3 performs the following steps: calculating a second to-be-numbered glint vector between any two to-be-numbered glint position coordinates to obtain a second to-be-numbered glint vector array; matching any two glint numbers in each second candidate glint numbering sequence with light source numbers in the ideal glint numbering sequence, and calculating a second ideal glint vector corresponding to each second to-be-numbered glint vector to obtain a second ideal glint vector array corresponding to the second to-be-numbered glint vector array; calculating a second vector angle between each second to-be-numbered glint vector and a corresponding second ideal glint vector to obtain a second vector angle array corresponding to each second candidate glint numbering sequence; determining whether a maximum value of the second vector angles in each second vector angle array is greater than a fifth preset threshold; when the maximum value of the second vector angles in a current second vector angle array is greater than the fifth preset threshold, deleting a corresponding second candidate glint numbering sequence; when the maximum value of the second vector angles in a current second vector angle array is less than or equal to the fifth preset threshold, retaining a corresponding second candidate glint numbering sequence as a fourth candidate glint numbering sequence; generating a set of fourth candidate glint numbering sequences using all retained fourth candidate glint numbering sequences; and determining whether the number of fourth candidate glint numbering sequences is 1.

In this embodiment of this application, the fifth preset threshold Angle_MAX may be set to 8 degrees, a value in the teens of degrees, or a value in the twenties of degrees, for example, setting the fifth preset threshold Angle_MAX to 25°.

When the number of fourth candidate glint numbering sequences is 1, the output module 4 uses the fourth candidate glint numbering sequence as the glint numbering result sequence corresponding to the current to-be-numbered glint position array, and loops back to storing, by the storage module 5 based on each glint number in the glint numbering result sequence, each to-be-numbered glint position coordinate in the to-be-numbered glint position array into the corresponding storage position in a corresponding glint position storage sequence in the typical value glint array.

Referring to FIG. 11, when the number of fourth candidate glint numbering sequences is not 1, the filtering module 3 performs the following steps: determining whether the number of fourth candidate glint numbering sequences in the set of fourth candidate glint numbering sequences is 0; when the number of fourth candidate glint numbering sequences in the set of fourth candidate glint numbering sequences is 0, establishing an eye image horizontal line coordinate system, and determining a third glint position conversion coordinate corresponding to each to-be-numbered glint position coordinate in a current to-be-numbered glint position array in the eye image horizontal line coordinate system; comparing magnitudes of the third glint position conversion coordinates, and identifying a to-be-numbered glint position coordinate corresponding to an interference glint according to a second preset rule; and deleting the identified to-be-numbered glint position coordinate corresponding to the interference glint from the current to-be-numbered glint position array to obtain an updated to-be-numbered glint position array, and looping back to generating a set of first candidate glint numbering sequences according to a first preset rule.

The specific steps for establishing the eye image horizontal line coordinate system at this point are the same as those for establishing the eye image horizontal line coordinate system when the number of second candidate glint numbering sequences in the set of second candidate glint numbering sequences is 0, and details are not repeated here.

Similarly, in this embodiment of this application, the second preset rule includes: identifying the to-be-numbered glint position coordinate corresponding to the maximum or minimum value of the third glint position conversion coordinates as an interference glint position coordinate. Specifically, depending on the method of establishing the coordinate system, the second preset rule has multiple determination rules. For example, the to-be-numbered glint position coordinate corresponding to the corresponding maximum or minimum x-coordinate value of the third glint position conversion coordinates is identified as the interference glint position coordinate, or the glint position coordinate corresponding to the maximum or minimum y-coordinate value of the third glint position conversion coordinates is identified as the interference glint position coordinate.

Similarly, taking the original eye image captured for the left eye as an example, the positive direction of the X-axis of the eye image horizontal line coordinate system is the direction of the vector from the second right eye center position coordinate $P_{right}$ to the second left eye center position coordinate $P_{left}$. The second preset rule specifically states that a larger absolute x-value of the corresponding third glint position conversion coordinate indicates a location closer to the other eye (right eye), and the to-be-numbered glint position coordinate corresponding to the maximum x-value of the third glint position conversion coordinates is most likely the interference glint position coordinate formed by a light source on the opposite side. Taking the original eye image captured for the right eye as an example, the positive direction of the X-axis of the eye image horizontal line coordinate system is the direction of the vector from the second right eye center position coordinate $P_{right}$ to the second left eye center position coordinate $P_{left}$. The second preset rule specifically states that a smaller absolute x-value of the corresponding third glint position conversion coordinate indicates a location closer to the other eye (left eye), and the to-be-numbered glint position coordinate corresponding to the minimum x-value of the third glint position conversion coordinates is most likely the interference glint position coordinate formed by a light source on the opposite side. Taking the original eye image captured for the left eye as an example, the positive direction of the Y-axis of the eye image horizontal line coordinate system is the direction of the vector from the second right eye center position coordinate $P_{right}$ to the second left eye center position coordinate $P_{left}$. The second preset rule specifically states that a larger absolute y-value of the corresponding third glint position conversion coordinate indicates a location closer to the other eye (right eye), and the to-be-numbered glint position coordinate corresponding to the maximum y-value of the third glint position conversion coordinates is most likely the interference glint position coordinate formed by a light source on the opposite side. Taking the original eye image captured for the right eye as an example, the positive direction of the Y-axis of the eye image horizontal line coordinate system is the direction of the vector from the second right eye center position coordinate $P_{right}$ to the second left eye center position coordinate $P_{left}$. The second preset rule specifically states that a smaller absolute y-value of the corresponding third glint position conversion coordinate indicates a location closer to the other eye (left eye), and the to-be-numbered glint position coordinate corresponding to the minimum y-value of the third glint position conversion coordinates is most likely the interference glint position coordinate formed by a light source on the opposite side.

Referring to FIG. 12, when the number of fourth candidate glint numbering sequences in the set of fourth candidate glint numbering sequences is not 0, the filtering module 3 performs the following steps: calculating a candidate glint side length of each second to-be-numbered glint vector to obtain a corresponding candidate glint side length array; calculating an ideal glint side length of a second ideal glint vector corresponding to each second to-be-numbered glint vector in each second ideal glint vector array to obtain an ideal glint side length array corresponding to each fourth candidate glint numbering sequence; calculating a glint side length ratio of each ideal glint side length in the ideal glint side length array divided by the corresponding candidate glint side length to obtain a glint side length ratio array corresponding to each fourth candidate glint numbering sequence; selecting a maximum value and a minimum value of the glint side length ratios from each glint side length ratio array; calculating a first extreme value ratio of the maximum value of the glint side length ratios divided by the corresponding minimum value of the glint side length ratios; determining whether each first extreme value ratio is greater than a sixth preset threshold, where in this embodiment of this application, the sixth preset threshold may be set to 1.5; when a current first extreme value ratio is greater than the sixth preset threshold, deleting a corresponding fourth candidate glint numbering sequence; when the current first extreme value ratio is less than or equal to the sixth preset threshold, retaining a corresponding fourth candidate glint numbering sequence as a fifth candidate glint numbering sequence; generating a set of fifth candidate glint numbering sequences using all retained fifth candidate glint numbering sequences; and determining whether the number of fifth candidate glint numbering sequences is 1.

When the number of fifth candidate glint numbering sequences is 1, the output module 4 uses the fifth candidate glint numbering sequence as the glint numbering result sequence corresponding to the current to-be-numbered glint position array, and loops back to storing, by the storage module 5 based on each glint number in the glint numbering result sequence, each to-be-numbered glint position coordinate in the to-be-numbered glint position array into the corresponding storage position in a corresponding glint position storage sequence in the typical value glint array.

Referring to FIG. 12, when the number of fifth candidate glint numbering sequences is not 1, the filtering module 3 performs the following steps: determining whether the number of fifth candidate glint numbering sequences in the set of fifth candidate glint numbering sequences is 0; when the number of fifth candidate glint numbering sequences in the set of fifth candidate glint numbering sequences is 0, establishing an eye image horizontal line coordinate system, and determining a fourth glint position conversion coordinate corresponding to each to-be-numbered glint position coordinate in a current to-be-numbered glint position array in the eye image horizontal line coordinate system; comparing magnitudes of the fourth glint position conversion coordinates, and identifying a to-be-numbered glint position coordinate corresponding to an interference glint according to a second preset rule; deleting the identified to-be-numbered glint position coordinate corresponding to the interference glint from the current to-be-numbered glint position array to obtain an updated to-be-numbered glint position array; and regenerating all permutation sequences corresponding to all light source numbers based on the number of glints corresponding to the updated to-be-numbered glint position array, and storing them as updated first candidate glint numbering sequences to form an updated set of first candidate glint numbering sequences.

The specific steps for establishing the eye image horizontal line coordinate system at this point are the same as those for establishing the eye image horizontal line coordinate system when the number of second candidate glint numbering sequences in the set of second candidate glint numbering sequences is 0, and details are not repeated here.

Similarly, in this embodiment of this application, the second preset rule includes: identifying the to-be-numbered glint position coordinate corresponding to the maximum or minimum value of the fourth glint position conversion coordinates as the interference glint position coordinate. Specifically, depending on the method of establishing the coordinate system, the second preset rule has multiple determination rules. For example, the to-be-numbered glint position coordinate corresponding to the maximum or minimum x-coordinate value of the fourth glint position conversion coordinates is identified as the interference glint position coordinate, or the to-be-numbered glint position coordinate corresponding to the maximum or minimum y-coordinate value of the fourth glint position conversion coordinates is identified as the interference glint position coordinate.

Similarly, taking the original eye image captured for the left eye as an example, the positive direction of the X-axis of the eye image horizontal line coordinate system is the direction of the vector from the second right eye center position coordinate $P_{right}$ to the second left eye center position coordinate $P_{left}$. The second preset rule specifically states that a larger x-value of the corresponding fourth glint position conversion coordinate indicates a location closer to the other eye (right eye), and the to-be-numbered glint position coordinate corresponding to the maximum x-value of the fourth glint position conversion coordinates is most likely the interference glint position coordinate formed by a light source on the opposite side. Taking the original eye image captured for the right eye as an example, the positive direction of the X-axis of the eye image horizontal line coordinate system is the direction of the vector from the second right eye center position coordinate $P_{right}$ to the second left eye center position coordinate $P_{left}$. The second preset rule specifically states that a smaller x-value of the corresponding fourth glint position conversion coordinate indicates a location closer to the other eye (left eye), and the to-be-numbered glint position coordinate corresponding to the minimum x-value of the fourth glint position conversion coordinates is most likely the interference glint position coordinate formed by a light source on the opposite side. Taking the original eye image captured for the left eye as an example, the positive direction of the Y-axis of the eye image horizontal line coordinate system is the direction of the vector from the second right eye center position coordinate $P_{right}$ to the second left eye center position coordinate $P_{left}$. The second preset rule specifically states that a larger y-value of the corresponding fourth glint position conversion coordinate indicates a location closer to the other eye (right eye), and the to-be-numbered glint position coordinate corresponding to the maximum y-value of the fourth glint position conversion coordinates is most likely the interference glint position coordinate formed by a light source on the opposite side. Taking the original eye image captured for the right eye as an example, the positive direction of the Y-axis of the eye image horizontal line coordinate system is the direction of the vector from the second right eye center position coordinate $P_{right}$ to the second left eye center position coordinate $P_{left}$. The second preset rule specifically states that a smaller y-value of the corresponding fourth glint position conversion coordinate indicates a location closer to the other eye (left eye), and the to-be-numbered glint position coordinate corresponding to the minimum y-value of the fourth glint position conversion coordinates is most likely the interference glint position coordinate formed by a light source on the opposite side.

Referring to FIG. 13, when the number of fifth candidate glint numbering sequences in the set of fifth candidate glint numbering sequences is not 0, the filtering module 3 performs the following steps: calculating a to-be-numbered glint inner angle between each pair of adjacent second to-be-numbered glint vectors to obtain a to-be-numbered glint inner angle array; calculating an ideal glint inner angle between each pair of adjacent second to-be-numbered glint vectors in each second ideal glint vector array to obtain an ideal glint inner angle array corresponding to each fifth candidate glint numbering sequence; calculating a third difference between each to-be-numbered glint inner angle and a corresponding ideal glint inner angle in each ideal glint inner angle array to obtain a third difference array corresponding to each fifth candidate glint numbering sequence; obtaining a maximum value of the third differences corresponding to each third difference array; selecting a maximum value of the second vector angles, the first extreme value ratio, and the maximum value of the third differences corresponding to each fifth candidate glint numbering sequence as second scoring metrics; and assigning a corresponding second preset weight to each second scoring metric, and calculating a second comprehensive score corresponding to each fifth candidate glint numbering sequence through weighted calculation.

In this embodiment of this application, the second comprehensive score is calculated using the following formula:

$$Score2 = a_2 \cdot \text{angle\_max\_new} + b_2 \cdot \text{ratio\_max} / \text{ratio\_min} + c_2 \cdot \text{interiorangle\_max}$$

where Score2 is the second comprehensive score, angle_max_new is the maximum value of the second vector angles, ratio_max/ratio_min is the first extreme value ratio, interiorangle_max is the maximum value of the third differences, and $a_2$, $b_2$, $c_2$ are the second preset weights corresponding to the maximum value of the second vector angles, the first extreme value ratio, and the maximum value of the third differences, respectively. In one embodiment, $a_2$, $b_2$, $c_2$ may be set to 0.2, 0.2, 0.6, respectively.

The output module 4 selects the fifth candidate glint numbering sequence with the lowest second comprehensive score as the glint numbering result sequence, and loops back to storing, by the storage module 5 based on each glint number in the glint numbering result sequence, each to-be-numbered glint position coordinate in the to-be-numbered glint position array into the corresponding storage position in a corresponding glint position storage sequence in the typical value glint array.

Referring to FIG. 14, when the number of glints in the to-be-numbered glint position array is not greater than 1, where the number of glints in the to-be-numbered glint position array is 1, the filtering module 3 performs the following steps: determining whether there exists a glint position storage sequence in the current typical value glint array with a typical glint position coordinate that is not an initial value; and when there does not exist a glint position storage sequence in the current typical value glint array with a typical glint position coordinate that is not an initial value, skipping performing numbering on the current to-be-numbered glint position array, and looping back to processing a to-be-numbered glint position array corresponding to a next frame of the original eye image.

When there exists a glint position storage sequence in the current typical value glint array with a typical glint position coordinate that is not an initial value, the output module 4 selects a glint number of the glint position storage sequence corresponding to the typical glint position coordinate closest to a current to-be-numbered glint position coordinate to obtain a corresponding glint numbering result sequence, and loops back to storing, by the storage module 5 based on each glint number in the glint numbering result sequence, each to-be-numbered glint position coordinate in the to-be-numbered glint position array into the corresponding storage position in a corresponding glint position storage sequence in the typical value glint array.

In addition, an embodiment of this application further provides a glint numbering device, the device including a processor and a memory; where the memory is configured to store one or more program instructions; and the processor is configured to execute the one or more program instructions to perform the steps of any one of the glint numbering method described above.

In addition, an embodiment of this application further provides a computer-readable storage medium, where the computer-readable storage medium has a computer program stored thereon, and the computer program, when executed by a processor, implements the steps of any one of the glint numbering method described above.

In this embodiment of this application, the processor may be an integrated circuit chip with signal processing capabilities. The processor may be a general-purpose processor, a digital signal processor (Digital Signal Processor, DSP), an application specific integrated circuit (Application Specific Integrated Circuit, ASIC), a field programmable gate array (Field Programmable Gate Array, FPGA), or other programmable logic devices, discrete gate or transistor logic devices, or discrete hardware components.

The methods, steps, and logic block diagrams disclosed in the embodiments of this application can be implemented or executed. A general-purpose processor may be a microprocessor, or the processor may be any conventional processor, etc. The steps of the methods disclosed in the embodiments of this application can be directly executed by a hardware decoding processor or executed by a combination of hardware and software modules in the decoding processor. The software modules may be located in mature storage media in the field, such as random access memory, flash memory, read-only memory, programmable read-only memory, electrically erasable programmable memory, registers, etc. The processor reads the information in the storage medium and completes the steps of the above methods in combination with its hardware.

The storage medium may be a memory, for example, a volatile memory or a non-volatile memory, or may include both volatile and non-volatile memories.

The non-volatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory.

The volatile memory may be a random access memory (Random Access Memory, RAM), used as an external cache. By way of example but not limitation, many forms of RAM are available, such as static random access memory (Static RA, SRAM), dynamic random access memory (Dynamic RAM, DRAM), synchronous dynamic random access memory (Synchronous DRAM, SDRAM), double data rate synchronous dynamic random access memory (Double Data RateSDRAM, DDRSDRAM), enhanced synchronous dynamic random access memory (Enhanced SDRAM, ESDRAM), synchronous link dynamic random access memory (Synchlink DRAM, SLDRAM), and direct Rambus random access memory (DirectRambus RAM, DRRAM).

The storage medium described in the embodiments of this application is intended to include, but is not limited to, these and any other suitable types of memory.

Those skilled in the art should realize that, in one or more of the examples described above, the functions described in the present invention can be implemented by a combination of hardware and software. When software is applied, the corresponding functions can be stored in a computer-readable medium or transmitted as one or more instructions or codes on a computer-readable medium. Computer-readable media include computer storage media and communication media, where communication media include any medium that facilitates the transfer of a computer program from one place to another. A storage medium may be any available medium that a general-purpose or special-purpose computer can access.

Although the present invention has been described in detail above with general descriptions and specific embodiments, it is apparent to those skilled in the art that some modifications or improvements can be made on the basis of the present invention. Therefore, such modifications or improvements made without departing from the spirit of the present invention fall within the scope of protection claimed by the present invention.

The invention claimed is:

1. A glint numbering method, characterized in that the method comprises:

performing initialization detection on ideal glint position coordinates for each light source in a light source group to generate a sorted ideal glint position array and a corresponding ideal glint numbering sequence;

receiving a sorted to-be-numbered glint position array and generating a set of first candidate glint numbering sequences according to a first preset rule;

determining whether the number of glints in the to-be-numbered glint position array is greater than 1;

when the number of glints in the to-be-numbered glint position array is greater than 1, calculating a first to-be-numbered glint vector between coordinates of a pair of adjacent to-be-numbered glint positions to obtain a first to-be-numbered glint vector array;

matching each pair of adjacent glint numbers in each first candidate glint numbering sequence with light source numbers in the ideal glint numbering sequence, and calculating a corresponding first ideal glint vector for each first to-be-numbered glint vector to obtain a first ideal glint vector array corresponding to each first to-be-numbered glint vector array;

calculating a first vector angle between each first to-be-numbered glint vector and a corresponding first ideal glint vector to obtain a first vector angle array corresponding to each first candidate glint numbering sequence;

determining whether a maximum value of the first vector angles in each first vector angle array is greater than a first preset threshold;

when the maximum value of the first vector angles in a current first vector angle array is greater than the first preset threshold, deleting a corresponding first candidate glint numbering sequence;

when the maximum value of the first vector angles in a current first vector angle array is less than or equal to the first preset threshold, retaining a corresponding first candidate glint numbering sequence as a second candidate glint numbering sequence;

generating a set of second candidate glint numbering sequences using all retained second candidate glint numbering sequences;

determining whether the number of second candidate glint numbering sequences is 1; and when the number of second candidate glint numbering sequences is 1, using the second candidate glint numbering sequence as a glint numbering result sequence corresponding to the current to-be-numbered glint position array.

2. The glint numbering method according to claim 1, characterized in that before determining whether the number of glints in the to-be-numbered glint position array is greater than 1, the method further comprises:

determining whether an original eye image corresponding to the to-be-numbered glint position array is a first frame of a captured eye image;

when the original eye image corresponding to the to-be-numbered glint position array is not the first frame of the captured eye image, forming an original eye image pair using a current original eye image and a previous frame of the original eye image;

detecting, based on the original eye image pair, whether a target human eye is in a first gaze state;

when the target human eye is in the first gaze state, directly referencing a glint numbering result sequence of the previous frame of the original eye image as the glint numbering result sequence corresponding to the current to-be-numbered glint position array;

when the target human eye is not in the first gaze state, detecting, based on the original eye image pair, whether the target human eye is in a second gaze state;

when the target human eye is in the second gaze state, directly referencing the glint numbering result sequence of the previous frame of the original eye image as the glint numbering result sequence corresponding to the current to-be-numbered glint position array; and when the original eye image corresponding to the to-be-numbered glint position array is the first frame of the captured eye image or the target human eye is not in the second gaze state, determining whether the number of glints in the to-be-numbered glint position array is greater than 1.

3. The glint numbering method according to claim 2, characterized in that the detecting, based on the original eye image pair, whether the target human eye is in the first gaze state comprises:

obtaining, for the original eye image pair, a positional coordinate pair of a first pupil center point;

calculating a first difference based on the positional coordinate pair of the first pupil center point;

using the first difference as first detection information;

determining whether the first detection information satisfies a first preset condition, wherein the first preset condition is that the first difference is less than a second preset threshold;

when the first detection information satisfies the first preset condition, determining whether the number of glint numbers in the glint numbering result sequence of the previous frame of the original eye image is equal to the number of glints in the current to-be-numbered glint position array;

when the number of glint numbers in the glint numbering result sequence of the previous frame of the original eye image is equal to the number of glints in the current to-be-numbered glint position array, determining that the target human eye is in the first gaze state; and when the first detection information does not satisfy the first preset condition, or the number of glint numbers in the glint numbering result sequence of the previous frame of the original eye image is not equal to the number of glints in the current to-be-numbered glint position array, determining that the target human eye is not in the first gaze state.

4. The glint numbering method according to claim 3, characterized in that the detecting, based on the original eye image pair, whether the target human eye is in a second gaze state comprises:

obtaining, for the original eye image pair, each to-be-numbered glint position coordinate pair and a total number pair of to-be-numbered glint position coordinates from a corresponding to-be-numbered glint position array;

calculating a corresponding second difference based on the each to-be-numbered glint position coordinate pair;

using each second difference and the total number pair of to-be-numbered glint position coordinates as second detection information;

determining whether the second detection information satisfies a second preset condition, wherein the second preset condition is that each second difference is less than a third preset threshold and that two total numbers of to-be-numbered glint positional coordinates in the total number pair of to-be-numbered glint position coordinates are identical;

when the second detection information satisfies the second preset condition, determining that the target human eye is in the second gaze state; and when the second detection information does not satisfy the second preset condition, determining that the target human eye is not in the second gaze state.

5. The glint numbering method according to claim 1, characterized in that the method further comprises:

when the number of second candidate glint numbering sequences is not 1, determining whether the number of second candidate glint numbering sequences in the set of second candidate glint numbering sequences is 0;

when the number of second candidate glint numbering sequences in the set of second candidate glint numbering sequences is 0, establishing an eye image horizontal line coordinate system, and determining a first glint position conversion coordinate corresponding to each to-be-numbered glint position coordinate in a current to-be-numbered glint position array in the eye image horizontal line coordinate system;

comparing magnitudes of the first glint position conversion coordinates, and identifying a to-be-numbered glint position coordinate corresponding to an interference glint according to a second preset rule; and deleting the identified to-be-numbered glint position coordinate corresponding to the interference glint from the current to-be-numbered glint position array to obtain an updated to-be-numbered glint position array, and looping back to generating a set of first candidate glint numbering sequences according to a first preset rule.

6. The glint numbering method according to claim 5, further comprising:

sequentially assigning a storage number for a glint position storage sequence corresponding to each light source using each light source number in a light source group;

setting an initial value for each glint position storage sequence to construct a typical value glint array;

storing, based on each glint number in the glint numbering result sequence, each to-be-numbered glint position coordinate in the to-be-numbered glint position array into a corresponding storage position in a corresponding glint position storage sequence in the typical value glint array; and calculating, for each glint position storage sequence, an average value/median value/weighted sum value of all stored values as a corresponding typical glint position coordinate.

7. The glint numbering method according to claim 6, characterized in that the method further comprises:

when the number of second candidate glint numbering sequences in the set of second candidate glint numbering sequences is not 0, determining whether the number of glints in the to-be-numbered glint position array is greater than 2;

when the number of glints in the to-be-numbered glint position array is not greater than 2, wherein the number of glints in the to-be-numbered glint position array is 2, determining whether the glint position storage sequence corresponding to each glint number in each second candidate glint numbering sequence has a typical glint position coordinate that is not an initial value;

when the glint position storage sequence corresponding to each glint number in each second candidate glint numbering sequence has a typical glint position coordinate that is not an initial value, sequentially calculating, for each second candidate glint numbering sequence, a third distance between one to-be-numbered glint position coordinate in the to-be-numbered glint position array and the corresponding typical glint position coordinate, and a fourth distance between another to-be-numbered glint position coordinate and the corresponding typical glint position coordinate;

using the third distance and the fourth distance as a distance error pair, and forming a distance error pair array corresponding to the set of second candidate glint numbering sequences from the distance error pairs corresponding to individual second candidate glint numbering sequences;

using the glint numbers in the second candidate glint numbering sequence corresponding to a maximum value of the third distance and a maximum value of the fourth distance in the distance error pair array as a first glint number and a second glint number, respectively;

determining whether the first glint number is equal to the second glint number;

when the first glint number is not equal to the second glint number, comparing the maximum value of the third distance and the maximum value of the fourth distance, deleting the distance error pair corresponding to the larger value from the distance error pair array, deleting the second candidate glint numbering sequence corresponding to the larger value from the set of second candidate glint numbering sequences, and looping back to determining whether the number of second candidate glint numbering sequences is 1;

when the first glint number is equal to the second glint number, determining whether the number of current second candidate glint numbering sequences is greater than 2;

when the number of current second candidate glint numbering sequences is greater than 2, deleting the second candidate glint numbering sequence corresponding to the first glint number and the second glint number from the set of second candidate glint numbering sequences, deleting the distance error pair corresponding to the first glint number and the second glint number from the distance error pair array, and looping back to determining whether the number of second candidate glint numbering sequences is 1;

when the number of current second candidate glint numbering sequences is not greater than 2, wherein the number of current second candidate glint numbering sequences is equal to 2, calculating a fifth distance between two to-be-numbered glint position coordinates and a sixth distance between typical glint position coordinates corresponding to two glint numbers in each second candidate glint numbering sequence;

calculating a ratio of the fifth distance to the sixth distance to obtain a corresponding first error reference ratio;

retaining a second candidate glint numbering sequence corresponding to a first error reference ratio closest to 1; and using the finally retained second candidate glint numbering sequence as the glint numbering result sequence corresponding to the current to-be-numbered glint position array, and looping back to storing, based on each glint number in the glint numbering result sequence, each to-be-numbered glint position coordinate in the to-be-numbered glint position array into the corresponding storage position in a corresponding glint position storage sequence in the typical value glint array.

8. The glint numbering method according to claim 7, characterized in that the method further comprises:

when in each second candidate glint numbering sequence, there exists a glint position storage sequence corresponding to a glint number and having only an initial value, directly calculating a fifth distance between two to-be-numbered glint position coordinates and a seventh distance between two ideal glint position coordinates in the ideal glint position array corresponding to two glint numbers in each second candidate glint numbering sequence;

calculating a ratio of the fifth distance to the seventh distance to obtain a corresponding second error reference ratio;

calculating an absolute value error between each second error reference ratio and 1;

determining whether the absolute value error is greater than a fourth preset threshold;

when the absolute value error is greater than the fourth preset threshold, deleting a corresponding second candidate glint numbering sequence;

when the absolute value error is less than or equal to the fourth preset threshold, retaining a corresponding second candidate glint numbering sequence as a third candidate glint numbering sequence;

generating a set of third candidate glint numbering sequences using all retained third candidate glint numbering sequences;

determining whether the number of third candidate glint numbering sequences is 1; and when the number of third candidate glint numbering sequences is 1, using the third candidate glint numbering sequence as the glint numbering result sequence corresponding to the current to-be-numbered glint position array, and looping back to storing, based on each glint number in the glint numbering result sequence, each to-be-numbered glint position coordinate in the to-be-numbered glint position array into the corresponding storage position in a corresponding glint position storage sequence in the typical value glint array.

9. The glint numbering method according to claim 8, characterized in that the method further comprises:

when the number of third candidate glint numbering sequences is not 1, determining whether the number of third candidate glint numbering sequences in the set of third candidate glint numbering sequences is 0;

when the number of third candidate glint numbering sequences in the set of third candidate glint numbering sequences is 0, establishing an eye image horizontal line coordinate system, and determining a second glint position conversion coordinate corresponding to each to-be-numbered glint position coordinate in the current to-be-numbered glint position array in the eye image horizontal line coordinate system;

comparing magnitudes of the second glint position conversion coordinates, and identifying a to-be-numbered glint position coordinate corresponding to an interference glint according to a second preset rule; and deleting the identified to-be-numbered glint position coordinate corresponding to the interference glint from the current to-be-numbered glint position array to obtain an updated to-be-numbered glint position array, and looping back to generating a set of first candidate glint numbering sequences according to a first preset rule.

10. The glint numbering method according to claim 9, characterized in that the method further comprises:

when the number of third candidate glint numbering sequences in the set of third candidate glint numbering sequences is not 0, calculating a second center point position coordinate between two to-be-numbered glint position coordinates and a first pupil center position coordinate of the original eye image;

calculating a first center point vector from the first pupil center position coordinate to the second center point position coordinate;

calculating, for the set of third candidate glint numbering sequences, a third center point position coordinate between two ideal glint position coordinates corresponding to two glint numbers in each third glint numbering sequence and an ideal pupil center position coordinate between the ideal glint position coordinates;

calculating a second center point vector from the ideal pupil center position coordinate to each third center point position coordinate;

calculating a third vector angle between the first center point vector and each second center point vector;

selecting an absolute value error, a second vector angle, and the third vector angle corresponding to each third candidate glint numbering sequence as first scoring metrics;

assigning a corresponding first preset weight to each first scoring metric, and calculating a first comprehensive score corresponding to each third candidate glint numbering sequence through weighted calculation; and selecting a third candidate glint numbering sequence with the lowest first comprehensive score as the glint numbering result sequence, and looping back to storing, based on each glint number in the glint numbering result sequence, each to-be-numbered glint position coordinate in the to-be-numbered glint position array into the corresponding storage position in a corresponding glint position storage sequence in the typical value glint array.

11. The glint numbering method according to claim 7, characterized in that the method further comprises:

when the number of glints in the to-be-numbered glint position array is greater than 2, calculating a second to-be-numbered glint vector between any two to-be-numbered glint position coordinates to obtain a second to-be-numbered glint vector array;

matching any two glint numbers in each second candidate glint numbering sequence with light source numbers in the ideal glint numbering sequence, and calculating a second ideal glint vector corresponding to each second to-be-numbered glint vector to obtain a second ideal glint vector array corresponding to the second to-be-numbered glint vector array;

calculating a second vector angle between each second to-be-numbered glint vector and a corresponding second ideal glint vector to obtain a second vector angle array corresponding to each second candidate glint numbering sequence;

determining whether a maximum value of the second vector angles in each second vector angle array is greater than a fifth preset threshold;

when the maximum value of the second vector angles in a current second vector angle array is greater than the fifth preset threshold, deleting a corresponding second candidate glint numbering sequence;

when the maximum value of the second vector angles in the current second vector angle array is less than or equal to the fifth preset threshold, retaining a corresponding second candidate glint numbering sequence as a fourth candidate glint numbering sequence;

generating a set of fourth candidate glint numbering sequences using all retained fourth candidate glint numbering sequences;

determining whether the number of fourth candidate glint numbering sequences is 1; and when the number of fourth candidate glint numbering sequences is 1, using the fourth candidate glint numbering sequence as the glint numbering result sequence corresponding to the current to-be-numbered glint position array, and looping back to storing, based on each glint number in the glint numbering result sequence, each to-be-numbered glint position coordinate in the to-be-numbered glint position array into the corresponding storage position in a corresponding glint position storage sequence in the typical value glint array.

12. The glint numbering method according to claim 11, characterized in that the method further comprises:

when the number of fourth candidate glint numbering sequences is not 1, determining whether the number of fourth candidate glint numbering sequences in the set of fourth candidate glint numbering sequences is 0;

when the number of fourth candidate glint numbering sequences in the set of fourth candidate glint numbering sequences is 0, establishing an eye image horizontal line coordinate system, and determining a third glint position conversion coordinate corresponding to each to-be-numbered glint position coordinate in the current to-be-numbered glint position array in the eye image horizontal line coordinate system;

comparing magnitudes of the third glint position conversion coordinates, and identifying a to-be-numbered glint position coordinate corresponding to an interference glint according to a second preset rule; and deleting the identified to-be-numbered glint position coordinate corresponding to the interference glint from the current to-be-numbered glint position array to obtain an updated to-be-numbered glint position array, and looping back to generating a set of first candidate glint numbering sequences according to a first preset rule.

13. The glint numbering method according to claim 12, characterized in that the method further comprises:

when the number of fourth candidate glint numbering sequences in the set of fourth candidate glint numbering sequences is not 0, calculating a candidate glint side length of each second to-be-numbered glint vector to obtain a corresponding candidate glint side length array;

calculating an ideal glint side length of a second ideal glint vector corresponding to each second to-be-numbered glint vector in each second ideal glint vector array to obtain an ideal glint side length array corresponding to each fourth candidate glint numbering sequence;

calculating a glint side length ratio of each ideal glint side length in the ideal glint side length array divided by the corresponding candidate glint side length to obtain a glint side length ratio array corresponding to each fourth candidate glint numbering sequence;

selecting a maximum value and a minimum value of the glint side length ratios from each glint side length ratio array;

calculating a first extreme value ratio of the maximum value of the glint side length ratios divided by the corresponding minimum value of the glint side length ratios;

determining whether each first extreme value ratio is greater than a sixth preset threshold;

when a current first extreme value ratio is greater than the sixth preset threshold, deleting a corresponding fourth candidate glint numbering sequence;

when the current first extreme value ratio is less than or equal to the sixth preset threshold, retaining a corresponding fourth candidate glint numbering sequence as a fifth candidate glint numbering sequence;

generating a set of fifth candidate glint numbering sequences using all retained fifth candidate glint numbering sequences;

determining whether the number of fifth candidate glint numbering sequences is 1; and when the number of fifth candidate glint numbering sequences is 1, using the fifth candidate glint numbering sequence as the glint numbering result sequence corresponding to the current to-be-numbered glint position array, and looping back to storing, based on each glint number in the glint numbering result sequence, each to-be-numbered glint position coordinate in the to-be-numbered glint position array into the corresponding storage position in a corresponding glint position storage sequence in the typical value glint array.

14. The glint numbering method according to claim 13, characterized in that the method further comprises:

when the number of fifth candidate glint numbering sequences is not 1, determining whether the number of fifth candidate glint numbering sequences in the set of fifth candidate glint numbering sequences is 0;

when the number of fifth candidate glint numbering sequences in the set of fifth candidate glint numbering sequences is 0, establishing an eye image horizontal line coordinate system, and determining a fourth glint position conversion coordinate corresponding to each to-be-numbered glint position coordinate in the current to-be-numbered glint position array in the eye image horizontal line coordinate system;

comparing magnitudes of the fourth glint position conversion coordinates, and identifying a to-be-numbered glint position coordinate corresponding to an interference glint according to a second preset rule;

deleting the identified to-be-numbered glint position coordinate corresponding to the interference glint from the current to-be-numbered glint position array to obtain an updated to-be-numbered glint position array; and regenerating all permutation sequences corresponding to all light source numbers based on the number of glints corresponding to the updated to-be-numbered glint position array, and storing them as updated first candidate glint numbering sequences to form an updated set of first candidate glint numbering sequences.

15. The glint numbering method according to claim 14, characterized in that the method further comprises:

when the number of fifth candidate glint numbering sequences in the set of fifth candidate glint numbering sequences is not 0, calculating a to-be-numbered glint inner angle between each pair of adjacent second to-be-numbered glint vectors to obtain a to-be-numbered glint inner angle array;

calculating an ideal glint inner angle between each pair of adjacent second to-be-numbered glint vectors in each second ideal glint vector array to obtain an ideal glint inner angle array corresponding to each fifth candidate glint numbering sequence;

calculating a third difference between each to-be-numbered glint inner angle and a corresponding ideal glint inner angle in each ideal glint inner angle array to obtain a third difference array corresponding to each fifth candidate glint numbering sequence;

obtaining a maximum value of the third differences corresponding to individual third difference arrays;

selecting a maximum value of the second vector angles, the first extreme value ratio, and the maximum value of the third differences corresponding to individual fifth candidate glint numbering sequence as second scoring metrics;

assigning a corresponding second preset weight to each second scoring metric, and calculating a second comprehensive score corresponding to each fifth candidate glint numbering sequence through weighted calculation; and selecting the fifth candidate glint numbering sequence with the lowest second comprehensive score as the glint numbering result sequence, and looping back to storing, based on each glint number in the glint numbering result sequence, each to-be-numbered glint position coordinate in the to-be-numbered glint position array into the corresponding storage position in a corresponding glint position storage sequence in the typical value glint array.

16. The glint numbering method according to claim 6, characterized in that the method further comprises:

when the number of glints in the to-be-numbered glint position array is not greater than 1, wherein the number of glints in the to-be-numbered glint position array is 1, determining whether there exists a glint position storage sequence in a current typical value glint array with a typical glint position coordinate that is not an initial value;

when there does not exist a glint position storage sequence in the current typical value glint array with a typical glint position coordinate that is not an initial value, skipping performing numbering on the current to-be-numbered glint position array, and looping back to processing a to-be-numbered glint position array corresponding to a next frame of the original eye image; and when there exists a glint position storage sequence in the current typical value glint array with a typical glint position coordinate that is not an initial value, selecting a glint number of the glint position storage sequence corresponding to the typical glint position coordinate closest to a current to-be-numbered glint position coordinate to obtain a corresponding glint numbering result sequence, and looping back to storing, based on each glint number in the glint numbering result sequence, each to-be-numbered glint position coordinate in the to-be-numbered glint position array into the corresponding storage position in a corresponding glint position storage sequence in the typical value glint array.

17. A glint numbering system configured to perform the steps of the glint numbering method according to claim 1, characterized in that the system comprising:

an initialization module configured to perform initialization detection on ideal glint position coordinates for each light source in a light source group to generate a sorted ideal glint position array and a corresponding ideal glint numbering sequence;

a generation module configured to receive a sorted to-be-numbered glint position array and generate a set of first candidate glint numbering sequences according to a first preset rule;

a filtering module configured to perform the following steps:

determining whether the number of glints in the to-be-numbered glint position array is greater than 1;

when the number of glints in the to-be-numbered glint position array is greater than 1, calculating a first to-be-numbered glint vector between coordinates of a pair of adjacent to-be-numbered glint positions to obtain a first to-be-numbered glint vector array;

matching each pair of adjacent glint numbers in each first candidate glint numbering sequence with light source numbers in the ideal glint numbering sequence, and calculating a corresponding first ideal glint vector for each first to-be-numbered glint vector to obtain a first ideal glint vector array corresponding to each first to-be-numbered glint vector array;

calculating a first vector angle between each first to-be-numbered glint vector and a corresponding first ideal glint vector to obtain a first vector angle array corresponding to each first candidate glint numbering sequence;

determining whether a maximum value of the first vector angles in each first vector angle array is greater than a first preset threshold;

when the maximum value of the first vector angles in a current first vector angle array is greater than the first preset threshold, deleting a corresponding first candidate glint numbering sequence;

when the maximum value of the first vector angles in the current first vector angle array is less than or equal to the first preset threshold, retaining a corresponding first candidate glint numbering sequence as a second candidate glint numbering sequence; and generating a set of second candidate glint numbering sequences using all retained second candidate glint numbering sequences; and an output module configured to determine whether the number of second candidate glint numbering sequences is 1, and when the number of second candidate glint numbering sequences is 1, use the second candidate glint numbering sequence as a glint numbering result sequence corresponding to the current to-be-numbered glint position array.

18. The glint numbering system according to claim 17, characterized in that the system further comprises a storage module configured to perform the following steps:

sequentially assigning a storage number for a glint position storage sequence corresponding to each light source using each light source number in a light source group;

setting an initial value for each glint position storage sequence to construct a typical value glint array;

storing, based on each glint number in the glint numbering result sequence, each to-be-numbered glint position coordinate in the to-be-numbered glint position array into a corresponding storage position in a corresponding glint position storage sequence in the typical value glint array; and calculating, for each glint position storage sequence, an average value/median value/weighted sum value of all stored values as a corresponding typical glint position coordinate.

19. A glint numbering device, characterized in that the device comprises a processor; and a memory; wherein the memory is configured to store one or more program instructions; and the processor is configured to execute the one or more program instructions to perform the steps of the glint numbering method according to claim 1.

20. A computer-readable storage medium, characterized in that the computer-readable storage medium has a computer program stored thereon, and the computer program, when executed by a processor, implements the steps of the glint numbering method according to claim 1.

* * * * *